US011673048B2

(12) United States Patent
Alderman et al.

(10) Patent No.: US 11,673,048 B2
(45) Date of Patent: Jun. 13, 2023

(54) CONTEXTUALLY AWARE COMMUNICATIONS SYSTEM IN VIDEO GAMES

(71) Applicant: Electronic Arts Inc., Redwood City, CA (US)

(72) Inventors: Kevin Todd Alderman, Santa Clarita, CA (US); John Preston Glenn, Los Angeles, CA (US); Brent Travis McLeod, Los Angeles, CA (US); Carlos Emmanuel Reyes Pineda, Los Angeles, CA (US); Rayme Christopher Vinson, Santa Clarita, CA (US)

(73) Assignee: ELECTRONIC ARTS INC., Redwood City, CA (US)

( * ) Notice: Subject to any disclaimer, the term of this patent is extended or adjusted under 35 U.S.C. 154(b) by 0 days.

(21) Appl. No.: 17/392,990

(22) Filed: Aug. 3, 2021

(65) Prior Publication Data

US 2022/0023759 A1 Jan. 27, 2022

Related U.S. Application Data

(63) Continuation of application No. 16/526,635, filed on Jul. 30, 2019, now Pat. No. 11,097,189.

(51) Int. Cl.
*A63F 13/23* (2014.01)
*A63F 13/5378* (2014.01)
*A63F 13/5372* (2014.01)

(52) U.S. Cl.
CPC .......... *A63F 13/5372* (2014.09); *A63F 13/23* (2014.09); *A63F 13/5378* (2014.09);
(Continued)

(58) Field of Classification Search
CPC .. A63F 13/5372; A63F 13/23; A63F 13/5378; A63F 2300/1025; A63F 2300/306; A63F 2300/307
See application file for complete search history.

(56) References Cited

U.S. PATENT DOCUMENTS 10,205,731 B2 2/2019 Khuu et al.
10,300,395 B1 5/2019 Kornmann et al.
(Continued)

OTHER PUBLICATIONS

"Chipteck," Smart Ping, Support, https://support.riotgames.com/hc/en-us/articles/201752974-Smart-Ping (Mar. 6, 2013), accessed Oct. 28, 2019.

*Primary Examiner* — David L Lewis
*Assistant Examiner* — Shauna-Kay Hall
(74) *Attorney, Agent, or Firm* — Knobbe, Martens, Olson & Bear, LLP

(57) ABSTRACT

In response to receiving user input command for sending a contextually aware communication, a computer system is configured to use game state data to determine a target location that a player is focusing on in a virtual environment in a video game, identify a unit that the player likely wants to communicate about based on at least priorities of unit types and proximities of units to the target location, and select a communication action for performance. Different communication actions can be performed in response to the same user input command when the game state data indicates different game states.

20 Claims, 25 Drawing Sheets

(52) U.S. Cl.
CPC . *A63F 2300/1025* (2013.01); *A63F 2300/306* (2013.01); *A63F 2300/307* (2013.01)

(56) References Cited

U.S. PATENT DOCUMENTS

| | | | |
|---|---|---|---|
| 11,097,189 B2 | 8/2021 | Aiderman et al. | |
| 2008/0318654 A1* | 12/2008 | Langridge | A63F 13/57 463/16 |
| 2010/0069152 A1* | 3/2010 | Nishimura | A63F 13/837 463/31 |
| 2010/0331089 A1 | 12/2010 | Priebatsch et al. | |
| 2012/0157210 A1 | 6/2012 | Hall | |
| 2013/0005475 A1 | 1/2013 | Mahajan et al. | |
| 2013/0337916 A1* | 12/2013 | Saretto | A63F 13/847 463/43 |
| 2014/0155166 A1* | 6/2014 | Ealey | A63F 13/30 463/31 |
| 2014/0274410 A1 | 9/2014 | Maynard et al. | |
| 2015/0031421 A1 | 1/2015 | Jo et al. | |
| 2017/0093882 A1* | 3/2017 | Khuu | G01S 5/0072 |

\* cited by examiner

| Priority Tier | Description | Unit Types | Communication Action | | Threshold Distance from Target Location |
|---|---|---|---|---|---|
| | | | Visual (At Unit Location) | Example Audio for First Character | |
| 1 | Dangerous units | Enemy characters | Crosshair icon | Enemy here | First auto aim distance |
| | | Explosives | Explosion icon | Explosives here | Second auto aim distance |
| | | Traps | Trap icon | Watch out for this trap | Second auto aim distance |
| 2 | Recent activity indicator unit | Evidence of battle | Icon based on type of evidence | Someone fought here recently | First distance |
| | | Footprints | Show footprints | I'm tracking the enemy | Second distance |
| 3 | Visual marker | See next column | Animation and color over existing marker | Roger that | Third distance |
| 4 | Neutral, interactive units | Portals | Location marker over portal | Portal here | Fourth distance |
| | | Doors | Outline and highlight door | Let's go through here | Fourth distance |
| | | Ladders | Outline and highlight ladder | Let's take the ladder | Fifth distance |
| | | Transportation | Outline unit and mark location | Let's take this *transportation type* here | Fourth distance |
| | | Item containers | Outline item container | Looking for items here | Container hitbox |
| | | NPC | NPC icon | The *NPC name* is here | Transportation hitbox |
| 5 | Items for pickup | Weapons | Show icon and description | *weapon type* here | Fifth distance |
| | | Ammo | Ammo type icon | *ammo type* here | Fifth distance |
| | | Health, shields, energy | Respective icons | Health, shield, or energy here | Sixth distance |
| | | Armor | Armor icon and color | *armor type* here | Sixth distance |
| | | Upgrades | Upgrade type icon and color | *upgrade type* of *upgrade level* here | Seventh distance |
| 6 | Other or none (default) | Terrain | Show distance to location | Let's go here | Zero |
| | | Open item container | None | None | Zero |
| | | Character uses skill | Location of use or effect | Using *skill type* here | Not applicable |

FIG. 3A

| Priority Tier | Description | Unit Types | Visual Customizations | Audio Customizations (Other Than Character Voice or Urgency) |
|---|---|---|---|---|
| 1 | Dangerous units | Enemy characters | Marker can be at static location or move with enemy | Announce enemy player name |
| 1 | Dangerous units | Explosives | Marker indicates explosive type | Announce type of explosive |
| 1 | Dangerous units | Traps | Marker indicates trap type | Announce type of trap |
| 2 | Recent activity indicator unit | Evidence of battle | None | Announce evidence type |
| 2 | Recent activity indicator unit | Footprints | Fade visual maker to show recency | Announce recency |
| 3 | Visual marker | See next column | Can change to indicate acceptance or rejection | Based on marker type and acceptance/rejection |
| 4 | Neutral, interactive units | Portals | Different for entry and exit portals | None |
| 4 | Neutral, interactive units | Doors | Different if open or closed | "someone came through here" if open |
| 4 | Neutral, interactive units | Ladders | None | None |
| 4 | Neutral, interactive units | Transportation | Can include icon for certain vehicles | None |
| 4 | Neutral, interactive units | Item containers | None | None |
| 4 | Neutral, interactive units | NPC | Can include icon to show transportation type | None |
| 5 | Items for pickup | Weapons | Icon based on weapon type and tier | Certain characters provide extra detail |
| 5 | Items for pickup | Ammo | Icon based on ammo type and quantity | Certain characters provide extra detail |
| 5 | Items for pickup | Health, shields, energy | Icon based on type and quantity | Certain characters provide extra detail |
| 5 | Items for pickup | Armor | Icon based on type | Certain characters provide extra detail |
| 5 | Items for pickup | Upgrades | Icon color based on type and upgrade level | "let's start here" if game just started |
| 5 | Items for pickup | Terrain | Based on time or mode of travel | "someone looted here" if not opened by team |
| 6 | Other or none (default) | Open item container | Location marker if not opened by team | "someone looted here" if not opened by team |
| 6 | Other or none (default) | Character uses skill | Varies based on type of skill | Watch out - enemy used *skill type * |

FIG. 3B though the virtual environment originating from the starting point controlled by the first user. The first threshold distance is based at least in part on a second threshold distance used by an aim-assist or auto-aim module in the video game. Selecting the first communication action is further based at least in part on: determining that a first distance between the first in-game unit and the target location is shorter than a second distance between a second in-game unit and the target location, wherein the second in-game unit is of the first unit type and is within the first threshold distance from the first target location; and wherein the first communication action includes visually marking a position of the first unit. The first communication action includes creating the first visual marker as a unit in a virtual environment in which the video game takes place, the first visual marker indicating a position of the first unit in the virtual environment. A size of the first visual marker as displayed to the second user is independent of a distance between the first position of the first unit and a second position of a character controlled by the first player. The method further includes, while the first visual marker is within a field of view of the second user: reducing a size of the first visual marker as seen by the second user in response to the field of view of the second user centering on the first visual marker; and increasing the size of the first visual marker as seen by the second user in response to the first visual marker moving toward the periphery of the second user. The method further includes: obtaining a second target location based at least in part on inputs provided by the second user; detecting the visual marker within a second threshold distance from the second target location; selecting a second communication action based on at least in part on: detecting the visual marker within the second threshold distance from the second target location, and a priority of visual markers; and in response to a second user pressing a second user input, transmitting data to cause the second communication action to the first user, wherein the second communication action includes an reply to the first communication action. The first visual marker is configured to be shown to the second user with a timed lifespan, and the timed lifespan is extended based at least in part on the second communication action.

CONTEXTUALLY AWARE COMMUNICATIONS SYSTEM IN VIDEO GAMES

INCORPORATION BY REFERENCE TO ANY PRIORITY APPLICATIONS

Any and all applications for which a foreign or domestic priority claim is identified in the Application Data Sheet as filed with the present application are incorporated by reference under 37 CFR 1.57 and made a part of this specification.

FIELD

This application generally relates to communications over computer network systems. Some aspects more specifically relate to facilitating communications between video game players over a computer network.

BACKGROUND

Multiplayer video games are becoming increasingly popular and increasingly complex. To allow for coordination between team members, some video games allow players to communicate with each other using voice communications and/or typed messages. Computer systems have relied on players to specifically input the actual voice message and/or the typed message to be communicated because computers systems are unable to read players' minds to determine what the players want to say to each other.

SUMMARY

Some aspects feature a computer-implemented method for sending contextually aware communications in a video game, the method comprising: obtaining a first target location in a virtual environment based at least in part on inputs provided by a first user; detecting a first in-game unit of a first unit type within a first threshold distance from the first target location; selecting a first communication action based at least in part on: detecting the first in-game unit of the first unit type within a first threshold distance from the first target location and a first priority associated with the first unit type and associated with the first communication action; and in response to the first user providing a first user input for sending a contextually aware communication first time, transmitting data to cause the first communication action to be communicated to a second user.

In various implementations, the method can include one, some, all, or any combination of the following. The method further includes: obtaining a second target location based at least in part on subsequent inputs provided by the first user; detecting a second in-game unit of a second unit type within a second threshold distance from the second target location, the second type of in-game unit being different from the first type of in-game unit; selecting a second communication action based on at least in part on: detecting the second in-game unit of the second unit type within the second threshold distance from the second target location, and a second priority associated with the second type of in-game unit and associated with the second communication action; and in response to the first user providing the first user input a second time, transmitting data to cause the second communication action to a second user, wherein the second communication action is different from the first communication action. The first target location can be determined based at least in part on one or more of: a trace or line of sight through a virtual environment originating from a starting point controlled by the first user; or a projectile path Some aspects feature a computer system for sending contextually aware communications in video games, the computer system comprising: one or more data stores storing computer-executable instructions and one or more processors. The one or more processors are configured to execute the computer executable instructions in order to perform operations comprising: obtaining a first target location in a virtual environment based at least in part on inputs provided by a first user; detecting a first in-game unit of a first unit type within a first threshold distance from the first target location; selecting a first communication action based at least in part on: detecting the first in-game unit of the first unit type within a first threshold distance from the first target location and a first priority associated with the first unit type and associated with the first communication action; and in response to the first user providing a first user input for sending a contextually aware communication first time, transmitting data to cause the first communication action to be communicated to a second user.

In various implementations, the computer system can include one, some, all, or any combination of the following. The operations can further include: obtaining a second target location based at least in part on subsequent inputs provided by the first user; detecting a second in-game unit of a second unit type within a second threshold distance from the second target location, the second type of in-game unit being different from the first type of in-game unit; selecting a second communication action based on at least in part on: detecting the second in-game unit of the second unit type within the second threshold distance from the second target location and a second priority associated with the second type of in-game unit and associated with the second communication action; and in response to the first user providing the first user input a second time, transmitting data to cause the second communication action to a second user, wherein the second communication action is different from the first communication action. The first target location is determined based at least in part on one or more of: a trace or line of sight through the virtual environment originating from a starting point controlled by the first user; or a projectile path through the virtual environment originating from the starting point controlled by the first user. The first threshold distance is based at least in part on a second threshold distance used by an aim-assist or auto-aim module in the video game. Selecting the first communication action is further based at least in part on: determining that a first distance between the first in-game unit and the target location is shorter than a second distance between a second in-game unit and the target location, wherein the second in-game unit is of the first unit type and is within the first threshold distance from the first target location; and wherein the first communication action includes visually marking a position of the first unit. The first communication action includes creating the first visual marker as a unit in a virtual environment in which the video game takes place, the first visual marker indicating a position of the first unit in the virtual environment. A size of the first visual marker as displayed to the second user is independent of a distance between the first position of the first unit and a second position of a character controlled by the first player. While the first visual marker is within a field of view of the second user, the operations can further include: reducing a size of the first visual marker as seen by the second user in response to the field of view of the second user centering on the first visual marker; and increasing the size of the first visual marker as seen by the second user in response to the first visual marker moving toward the periphery of the second user. The operations further include: obtaining a second target location based at least in part on inputs provided by the second user; detecting the visual marker within a second threshold distance from the second target location; selecting a second communication action based on at least in part on: detecting the visual marker within the second threshold distance from the second target location, and a priority of visual markers; and in response to a second user pressing a second user input, transmitting data to cause the second communication action to the first user, wherein the second communication action includes an reply to the first communication action. The first visual marker is configured to be shown to the second user with a timed lifespan; and the timed lifespan is extended based at least in part on the second communication action.

BRIEF DESCRIPTION OF THE DRAWINGS

FIG. 3A and FIG. 3B show an example table illustrating priority tiers of units and associated communication actions.

DETAILED DESCRIPTION

Introduction

Figure 1:
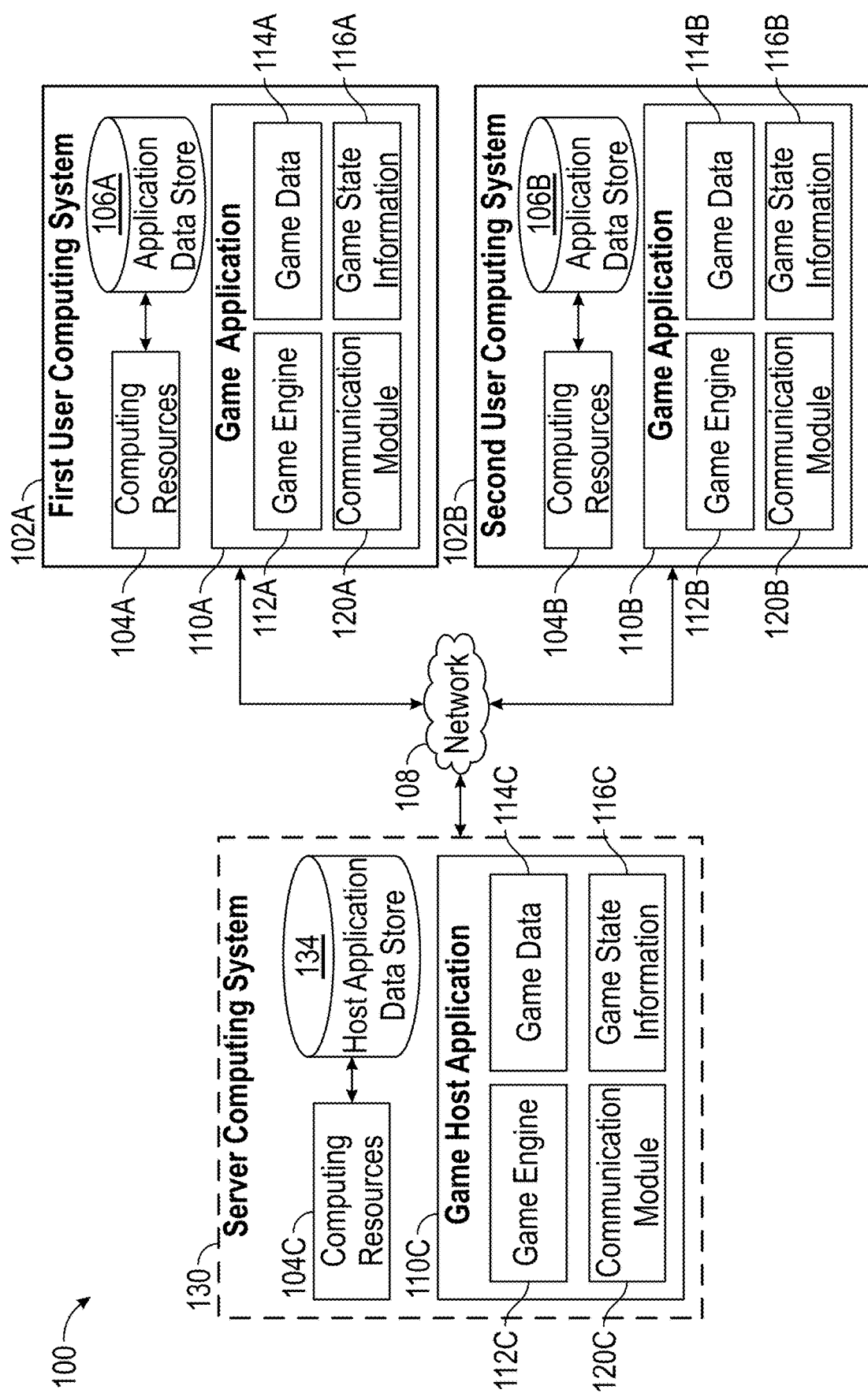
FIG. 1 illustrates an example of a multiplayer video game computing environment for sending contextually aware communications

Multiplayer video games have suffered from a long felt but unsolved need for improved player to player communications. Players of many multiplayer video games stand to benefit from improved coordination to improve team play experiences. There are various communication systems that can be implemented in a video game. For example, some systems allow for textual communications. The typing speeds of players, which can vary and be slow for many players, can limit the speed of textual communications and require players to divert their hands from providing other input to the video game. Some systems can allow players to press a dedicated button for each type of communication action to issue, such as a first button to issue first predetermined message and a different button to issue a different communication message. Such systems can be limited by the numbers of spare buttons available for dedicating to different communication actions, and players can have difficulty remembering which buttons are mapped to which communication actions. Some systems require players to provide a sequence of inputs, such as pressing and/or holding a first button to open a first page of a communications menu, select a category of communication messages presented in the first page, and then selecting a particular message to issue from among the messages in the selected category. However, navigating the menu takes a sequence of multiple inputs, players take time to read and navigate through the options in the communication menu, the menu can obscure action in the video game, and users may be prevented from making other interactions in the video game while the menu is open. Some systems support voice communications. Voice communications use additional network bandwidth for audio transmission, require players to have a microphone or other voice input hardware that players may not have, allow the possibility for players to speak abusive and offensive language, may pick up undesired background noise, and introduce additional sensitivity and volume variables. Ping systems can create a set ping indicator indication at a pinged location. The set ping indicator can sometimes be insufficient for fully conveying a desired message. For example, if the set ping indicator is created at a pinged location, other players might not be able to determine if the pinging player wants to move to the pinged location or beware of danger at the pinged location. Some ping systems may create different visual markers (such as a green marker for "go here" and a red marker for "danger") in response to additional selections sequences made by a pinging player. For example, a player may press and hold a button to open up a menu of options and make a selection from the menu of the type of ping marker to create. The added ability to specify the particular ping marker also adds the complexity discussed above for general menus. Various communication systems herein can feature one, some, or any combination of the above communication systems described above.

Additionally, a communication system can feature a contextually aware communication system, sometimes referred to as a "smart ping" system. The communication system can be configured to receive input from a player indicating a desire to communicate, determine a context in the video game, select a communication action from among a plurality of possible communication actions based on the context, and cause performance of the selected communication action to other players. Whereas other systems may use different user inputs and/or different sequences of user inputs to perform respective, different communication actions, the smart ping communication system disclosed herein can counter-intuitively use the same user input to the perform different communication actions instead of or in addition to using different user inputs. In some examples, the user input can be an interaction with a button, such as pressing a single button for communicating. In some examples, the player can make the same interaction with the same, single button to send one of a variety of different communication actions to other players based on a present, recent, and/or real time context in the video game. The context can include any aspect of a particular game state. For example, in a first context, if a player's character is looking at or near the location of an enemy in the video game, then the player can press a communication button to cause text or audio along the lines of, "Enemy spotted, let's attack here," to be communicated to other players on the team and for a first type of visual marker to be created at the enemy location to indicate danger. In a second context, if the player's character is looking at an in-game item that can be collected by characters of the player's teammates, then the player can press the same communication button to cause text or audio along the lines of, "There is an item here for you to collect," and for a second type of visual marker to be created at the item location to indicate the type of item available for pickup.

Depending on particular implementations, various contextually aware communication systems disclosed herein can have one, all, or any combination of the following features. A player can press one button to issue a variety of different communication actions. The player can do so quickly in real time without the added delay of reading or navigating through a menu of available communication actions. The player can do so quickly in real time without the added delay or distraction of typing. The player can do so using a single button without first memorizing which of a plurality of different buttons are mapped to which communication actions. Audio, video, graphics, and/or other sizable data for a plurality of communication actions can be cached or stored at local network locations, such as a game console or computer device of each player, such that a smaller amount of data can be transmitted over a network to select one of the plurality of communication actions, thereby saving network bandwidth in comparison to transmitting the audio, video, graphics, and/or other larger data. The available communication actions can include a sufficient variety of communications that players communicate in various contexts of the game such that players can improve their coordination and team play experience. Players can make use of the wide variety of communication actions without first purchasing a microphone or other audio input hardware. Players can quickly issue a number of different communication actions, the number exceeding the limited quantity of spare buttons available on input devices such as console controllers. Players can do so without a menu popping up to obscure the video game and without the delay of navigating through the menu. Players can do so without having input (such as directional movements, presses of buttons, and the like) directed away from in-game actions to apply to menus. The available communication actions can be limited and reviewed by developers to prevent offensive or abusive messages. Communication can involve playback of clear lines recorded as audio data such that clear words can be consistently understood by the players.

A limited description of the communication system is provided here in the introduction. Additional details and examples of a contextually aware communication system are disclosed below and with respect to the drawings.

Definitions

"Player" refers to real-world users (e.g., people) playing a video game as opposed to characters that fictitiously exist in the video game.

"Character" refers to an entity fictitiously existing in a video game as opposed to real-world users, people, or players.

Overview of Multiplayer Video Game Computing Environment

FIG. 1 illustrates an example of a multiplayer video game computing environment 100 for sending contextually aware communications. The environment 100 includes a network 108, a plurality of user computing systems 102A, 102B, and a server computing system 130. The user computing systems 102A, 102B respectively have computing resources 104A, 104B and application data stores 106A, 106B. The server computing system 130 has computing resources 104C and host application data store 134. The user computing systems 102A, 102B may communicate via a network 108 with each other and additionally or alternatively with the interactive computing system 130.

FIG. 1 includes two user computing systems 102A, 102B and one server computing system 130. However, the technology disclosed herein can be used with any other greater quantity of user computing systems. The technology disclosed herein can also be implemented using any greater quantity of server computing systems. In some examples, one or more of the user computing systems 102A, 102B can perform the server functions and directly communicate with each other, and the server computing system 130 can be optionally omitted. In some examples, computer functions can be distributed between the server 130 and the user computing systems 102A, 102B. Although only one network 108 is illustrated, multiple distinct and/or distributed networks 108 may exist.

Computing Systems

The computing systems 102A, 102B include respective computing resources 104A, 104B and application data stores 106A, 106B. The user computing systems 102A, 102B may have varied local computing resources 104A, 104B such as central processing units and architectures, memory, mass storage, graphics processing units, communication network availability and bandwidth, and so forth. The application data stores 106A, 106B can store non-transitory, computer-readable instructions for the local computing resources 104A, 104B to execute. Further, the user computing systems 102A, 102B may include any type of computing system, such as a desktop, laptop, video game platform/console, television set-top box, television (for example, Internet TVs), network-enabled kiosk, car-console device, computerized appliance, wearable device (for example, smart watches and glasses with computing functionality), and wireless mobile devices (for example, smart phones, PDAs, tablets, or the like), to name a few.

The user computing systems 102A, 102B can use the computing resources 104A, 104B to execute the game applications 110A, 110B. The user computing systems 102A, 102B receive user inputs from respective players to be executed by the game applications 110A, 110B and/or the server computer system 130, and the user computing systems 102A, 102B generate video outputs displaying the responses and progression of the video game. A more detailed description of an example of a computing system is described below with respect to FIG. 18.

The server computing system 130 includes computing resources 104C and host application data store 134. The server computing system 130 may have varied local computing resources 104C, such as central processing units and architectures, memory, mass storage, graphics processing units, communication network availability and bandwidth, and so forth. The host application data store 134 can store non-transitory, computer-readable instructions for the computing resources 104C to execute. Further, the server computing system 130 may include any type of computing system.

The server computing system 130 can use the computing resources 104C to execute the game host application 110C, which can be the same as or different from the game applications 110A, 110B. In some examples, the game host application 110C can be executed by one or more computing devices, such as servers and databases that may host and/or execute portions of one or more instances of the game applications 110A, 110B. A more detailed description of an example of a computing system is described below with respect to FIG. 18.

Unless otherwise specified, "one or more data stores" can refer to any one of the data stores 106A, 106B, 134 or any combination of the data stores 106A, 106B, 134 from user computing systems and/or server computing systems. Unless otherwise specified, "one or more processors" can refer to one or more processors from any one of the computing resources 104A, 104B, 104C or any combination of the computing resources 104A, 104B, 104C from user computing systems and/or server computing systems.

Game Host Application

The server computing system 130 may enable multiple users or computing systems to access a portion of the game host application 110C executed or hosted by the server computing system 130. The server computing system 130 can include a communication module 120C. In some examples, the game host application 110C may execute a hosting system for executing various aspects of a game environment. For example, the game host application 110C can record the location of characters and other units within the game environment. The game host application 110C may be a multiplayer game in which the server computing system 130 provides additional functionality when connected to the instance of the game applications 110A, 110B. For example, the server computing system 130 can facilitate the selection of a communication action based on a context in the game and facilitate the execution of the selected communication action from one player to another player. In some examples, the game host system 110C can provide a dedicated hosting service for hosting multiplayer game instances or facilitate the creation of game instances hosted by user computing devices 102A, 102B. In some examples, the game host application 110C can provide a lobby or other environment for users to virtually interact with one another.

Game Application

The user computing systems 102A, 102B can execute respective game applications 110A, 110B based on software code stored at least in part in the application data stores 106A, 106B. The game applications 110A, 110B may also be referred to as a videogame, a game, game code and/or a game program. A game application 110A, 110B should be understood to include software code that a computing device 102A, 102B can use to provide a game for a user to play. A game application 110 may comprise software code that informs computing resources 104A, 104B of processor instructions to execute, but may also include data used in the playing of the game, such as data relating to images, game state data, audio data, and other data structures. In the illustrated example, the game application 110A, 110B include game engines 112A, 112B, game data 114A, 114B, game state information 116A, 116B, and a communication module 120A, 120B.

The server computing system 130 can execute a game host application 110C based on software code stored at least in part in the host application data stores 134. The game host application 110C can perform services for the game applications 110A, 110B of the user computing systems 102A, 102B. A game host application 110C should be understood to include software code that a server computing system 130 can use to perform hosting services for a video game for a user to play. A game host application 110C may comprise software code that informs computing resources 104C of processor instructions to execute, but may also include data used in the servicing of the game, such as data relating to images, game state data, audio data, and other data structures. In the illustrated example, the game host application 110C includes game engine 112C, game data 114C, game state information 116C, and a communication module 120C.

The users computing systems 102A, 102B are capable of executing the game applications 110A, 110B, which may be stored and/or executed in a distributed environment. For example, the first user computing system 102A may execute a portion of a game, and a network-based computing system such as the server computing system 130 or the second user computing system 102B may execute another portion of the game. For instance, the game may be a massively multiplayer online role-playing game (MMORPG), first person shooter (FPS) game, multiplayer online battle arena (MOBA) game, real time strategy game (RTS), strategy game, adventure game, tactics game, board game, card game, action game, battle royale game, side scrolling game, puzzle game, sports game, fighting game, casual game, city building game, or other game type that includes a client portion executed by the user computing systems 102A, 102B and a server portion executed by one or more server computing systems 130.

Game Engine

The game engines 112A, 112B can be configured to execute aspects of the operation of the game applications 110A, 110B within the respective user computing devices 102A, 102B. The game engine 112C can be configured to execute aspects of the operation of the game host application 110C. Execution of aspects of gameplay within a game application can be based, at least in part, on the user input received, the game data 114A, 114B, 114C and game state information 116A, 116B, 116C. The game data 114A, 114B, 114C can include game rules, environmental settings, constraints, models, audio, visuals, units, databases, and/or other game application information.

One or any combination of the game engines 112A, 112B, 112C can execute gameplay within the game according to the game rules. Examples of game rules can include rules for scoring, possible inputs, actions/events, movement in response to inputs, and the like. Other components can control what inputs are accepted and how the game progresses, and other aspects of gameplay. The game engines 112A, 112B, 112C can receive and/or process the user inputs and determine in-game events, such as actions, jumps, runs, throws, attacks and other events appropriate for the game applications 110A, 110B, 110C. During runtime operation, the game engines 112A, 112B, 112C can read in game data 114A, 114B, 114C and game state information 116A, 116B, 116C to determine the appropriate in-game events.

After one or more of the game engines 112A, 112B, 112C determine character events, the character events can be conveyed to a movement engine that can determine the appropriate motions the characters should make in response to the events and passes those motions on to a physics engine. The physics engine can determine new poses for the characters and provide the new poses to a skinning and rendering engine. The skinning and rendering engine, in turn, can provide character images to an object combiner in order to combine animate, inanimate, and background objects into a full scene. The full scene can be conveyed to a renderer, which generates a new frame for display to the user. The process can repeated for rendering each frame during execution of the game application. Though the process has been described in the context of a character, the process can be applied to any process for processing events and rendering the output for display to a user.

Game Data

The game data 114A, 114B, 114C can include game rules, prerecorded motion capture poses/paths, environmental settings, environmental objects, constraints, skeleton models, audio, visuals, databases, and/or other game application information. At least a portion of the game data 114A, 114B, 114C can be stored in respective application data stores 106A, 106B, 106C. In some examples, a portion of the game data 114A, 114B, 114C may be received and/or stored remotely and be received through the network 108 during runtime of the game application. As further described with respect to FIG. 3A and FIG. 3B, the game data can include priorities of unit types and associated communication actions.

Game State Information

During runtime, the game applications 110A, 110B, 110C can store game state information 116A, 116B, 116C, which can include a game state, character states, environment states, scene object storage, and/or other information associated with a runtime state of the video game. For example, the game state information 116A, 116B, 116C can separately or collectively identify the state of the game applications 110A, 110B, 110C at a specific point in time, such as a character position, character orientation, character action, game level attributes, unit locations, item locations, and other information contributing to a state of the game. The game state information can include dynamic state information that continually changes, such as character movement positions, and static state information, such as the identification of a game level within the game.

Communication Module

The communication modules 120A, 120B, 120C can perform various functions to send contextually aware communications within the game application 110A, 110B, 110C and can operate during runtime of the game application 110. The communication modules 120A, 120B, 120C can use any combination of game data 114A, 114B, 114C and game state data 116A, 116B, 116C to perform various communication functions. In some examples, the communication module 120A may receive user input from a first player playing a video game on the first user computing system 102A during runtime. In response, the communication module 120A can use the context of the game to dynamically determine what communication the first player may want to send to a second player playing the video game on the second user communication system 102B. The communication modules 120A, optionally facilitated by communication module 120C, can transmit the communication actions over the network 108 for the communication module 120B to perform for the second player. The communication module 120B can then execute the contextually determined communication action. In various implementations, the communication functions can be implemented by any one or combination of communication modules 120A, 120B, 120C. Various aspects of the operation of the communication modules 120A, 120B, 120C are described in further detail below.

The contextually determined communication actions and/or an identification of the contextually determined communication actions can be transmitted over the network 108 to the other players. If an identification of the contextually determined communication actions is transmitted from the first user computing system 102A and/or server computing system 130 to a second user computing system 102B, then the second user computing system 102B can access and communicate any locally stored audio or visual content to the second player identified by the transmission. If the audio and/or video data of the contextually determined communication actions are transmitted over the network 108 from the first user computing system 102A and/or server computing system 130 to a second user computing system 102B, then the second user computing system 102B can receive and communicate the audio and/or video data to the second player.

Network

The network 108 can include any type of communication network. For example, the network 108 can include one or more of a wide area network (WAN), a local area network (LAN), a cellular network, an ad hoc network, a satellite network, a wired network, a wireless network, and so forth. In some examples, the network 108 can include the Internet.

Example Process

Figure 2:
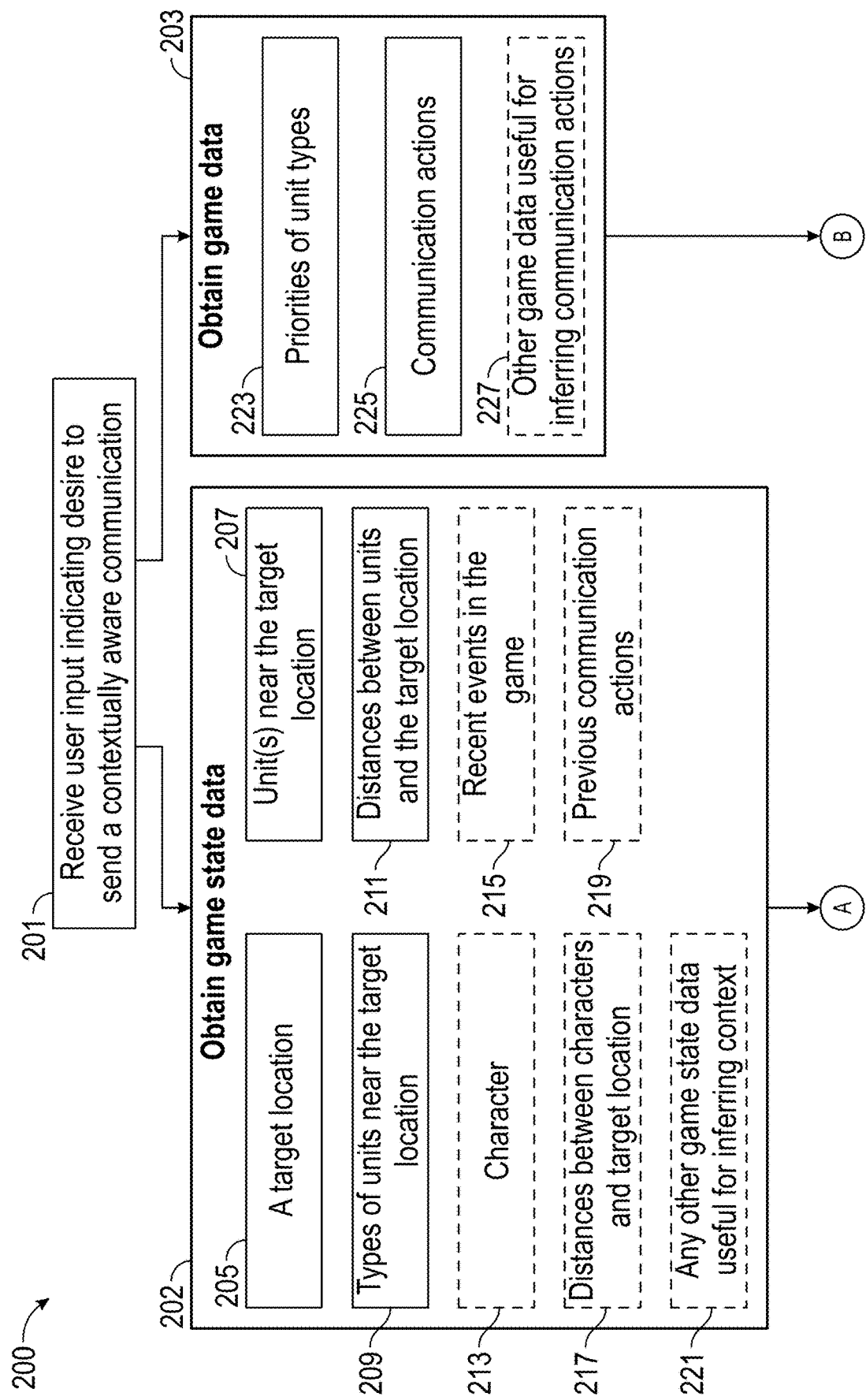
FIG. 2 shows an example flowchart of a process for selecting, sending, and performing contextually aware communication actions.
Figure 2:
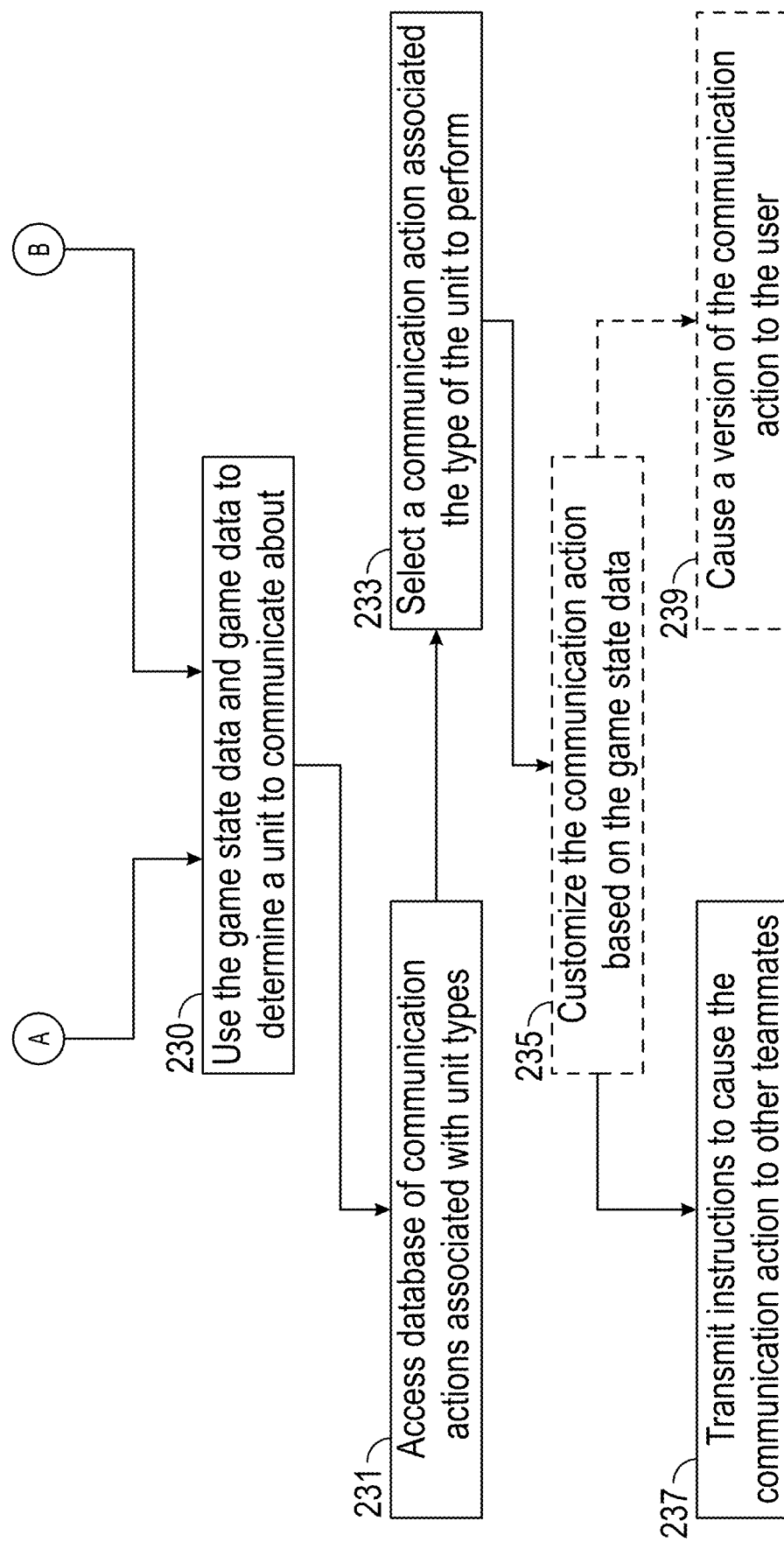

FIG. 2 shows an example flowchart of a process 200 for selecting, sending, and performing contextually aware communication actions. A communication action can be determined based at least in part on the priority of types of in-game units proximate to the target location that a player is focusing on. The process 200 can be performed in real time, and a communication action can be performed as though the players were communicating naturally in person.

At block 201, user input can be received from a first player indicating the user's desire to send a contextually aware communication. For example, the user can press a button on a controller, a key on a keyboard, a button on a mouse, a tap on a part of a touch screen, and the like whenever the user wants to send a contextually aware communication. In response to the user input, the system can, as a real time response, determine and perform a contextually aware communication action to other players based on a present context of the game as described with respect to blocks 203-239. The same user input (e.g., pressing the same button or key) can be subsequently received again by the first player to determine and perform subsequent communication actions that can vary based on subsequent contexts in the game.

At block 202, game state data can be obtained. A context derived from the game state data can be used to infer, determine, or select a communication action that the first player likely wants to perform. Game state data can include: a target location 205 that the first player is focusing on 205, units near the target location 207, types of the units near the target location 209, distances between the units and the target location 211, the character controlled by the first player to perform a communication action 213, recent events in the game 215, distances between characters and the target location 217, previous communication actions 219, and/or any other game state data useful for inferring a desired communication action 221.

At block 203, game data can be obtained. The game data can include instructions for how to use game state data to determine which communication actions to perform. The game data can include priorities of unit types 223, communication actions associated with various unit types 225, and any other game data useful for inferring communication a desired communication action 227.

At block 230, the game state data and game data can be used to determine an in-game unit or location to communicate about. For example, the game state data can be used to determine a location that a player is focusing on and which units are near that location. The unit of highest priority can be selected as the unit to communicate about. Further examples and details are discussed with respect to FIG. 4, FIG. 5A, and FIG. 5B.

At block 231, a database of communication actions can be accessed. The database includes associations between unit types and communication actions that the first player will likely want to perform, such as sending audio or visual communications to other players. An example database showing communication actions, both visual and audial, associated with unit types is further discussed with respect to FIG. 3A and FIG. 3B. Although a database is used to illustrate the relationships in this application to facilitate understanding, the relationships can be indicated using any type of data, such as in code, key-value pairs, objects and properties, and the like.

At block 233, one or more communication actions associated with the type of the unit that will be communicated about is selected according to the associations indicated in the database. The communication actions can include displaying visuals such as images, icons, markers, animations, text, colors, representative symbols, and the like. The communication actions can also include playing audio.

Figure 7:
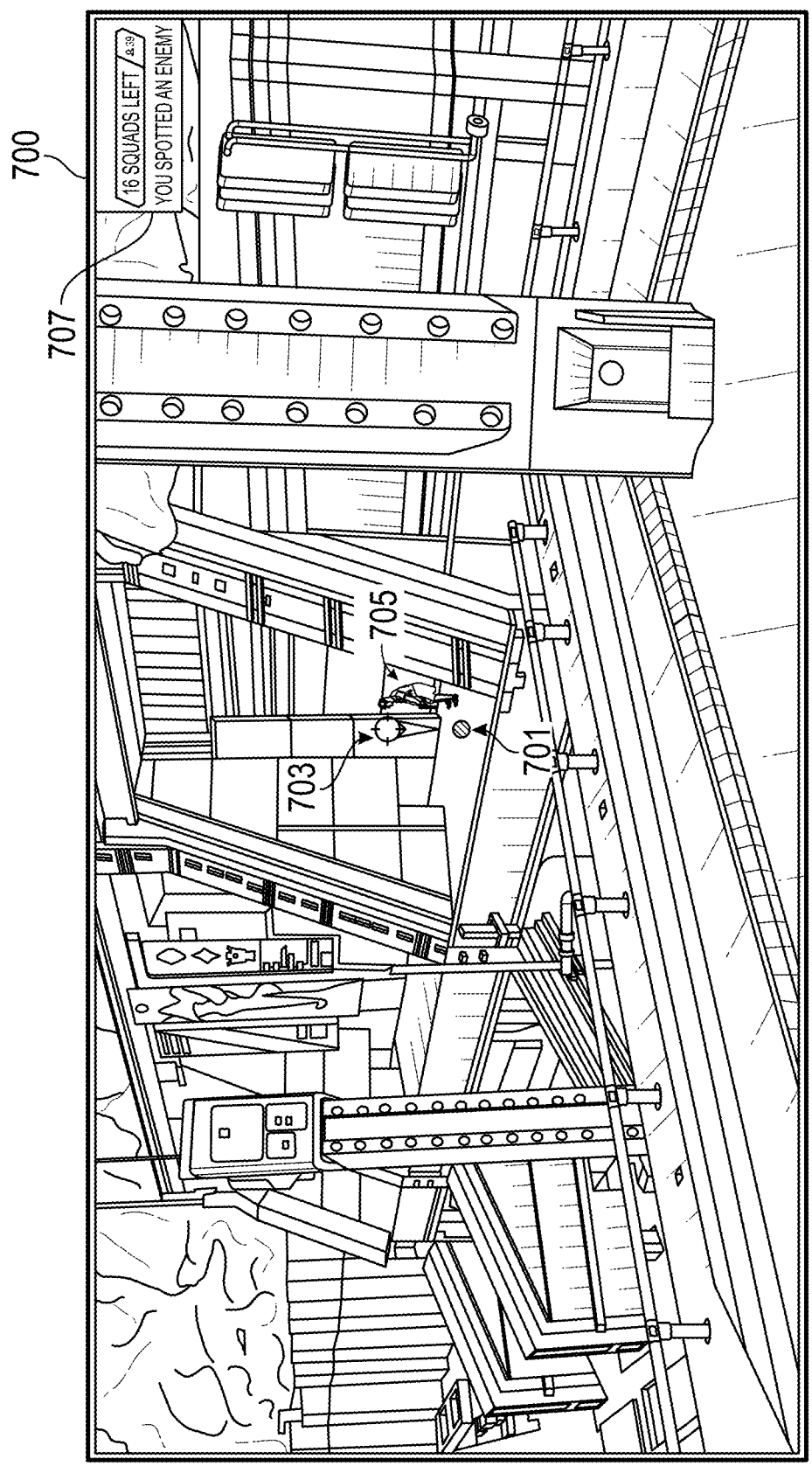
FIG. 7 shows an example illustrated screenshot of a player's field of view when making a contextual "enemy spotted" communication.

For example, if an enemy unit type 209 is near the target location 205, then a crosshair or other marker can be shown at the target location and a message, "Enemy spotted" can be announced to other players as further described with respect to FIG. 7. As another example, if an item unit type 209 is near the target location 205, then an icon can be displayed over the item and the discovery of the item can be audibly announced to other players such as further described with respect to FIG. 5A, FIG. 5B, FIG. 9, FIG. 10, FIG. 13A, FIG. 13B, FIG. 14A, and FIG. 14B. As another example, if no units are near the target location, then the target location itself can be marked as a destination and audibly suggested for the other players to go towards as further described with respect to FIG. 11A, FIG. 11B, FIG. 12A, and FIG. 12B.

In some variations, the process 200 can be modified such that a game engine begins by continuously performing blocks 230-233 to determine contextual communication actions for a player to perform as a game state dynamically progresses during gameplay. Whenever user input for sending a contextual communication is received, block 233 can progress onward and the selected communication action can be customized and performed as further described with respect to blocks 235-239.

Figure 8:
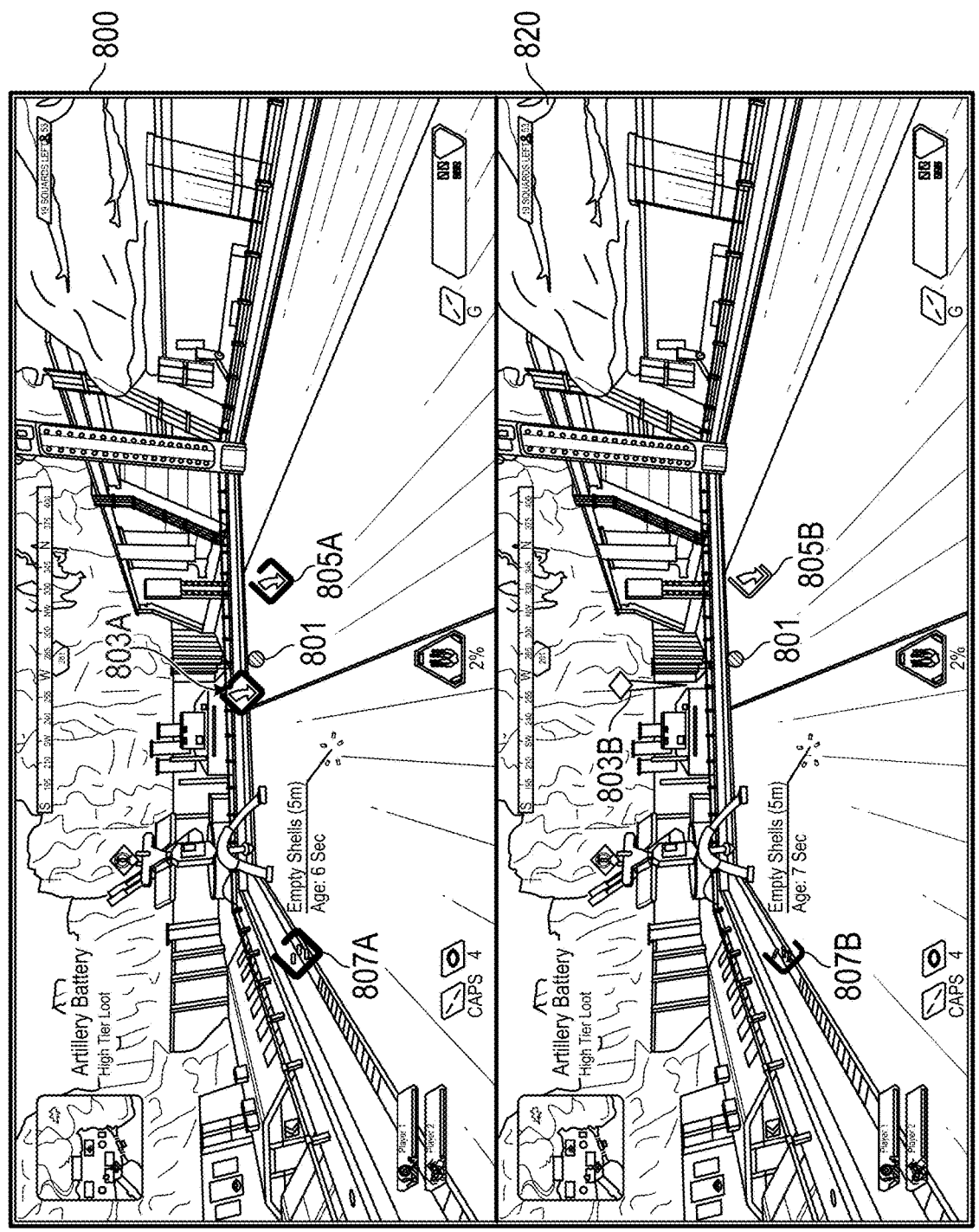
FIG. 8 shows example illustrated screenshots of a player's fields of view with time variant units that can be communicated about.

At block 235, the communication actions can optionally be further customized more specifically based on the game state data 203. For example, certain audio may be selected to reflect the different voice and different word choices of the character 217 who will be speaking. As another example, the communication actions can be customized based on recent events in the game 215, such as to indicate how recently an event occurred as shown in FIG. 8 or to indicate the occurrence of the recent event. Other examples of recent events include doors opening, using items, recent interactions between characters and the environment, recently using certain abilities or performing certain tasks, recent neutral or environment changes, shooting, running, winning, losing, activity by opponents, and the like. As another example, a distance between the characters and the target location 221 can be visually indicated and/or vocally commented about, such as by announcing, "Let's hurry here, it's pretty far off," if the target location is far away instead of announcing, "Let's go here," if the target location is closer.

A character's line might change to a reply based on a previous sequence of communication actions 219, such as to cancel or reply to a previous communication action. Other game state data 221 can be used to customize the communication actions in a variety of ways. In some implementations, the selection in block 233 and the customization in block 235 can be merged and performed together as part of the selection process 233.

At block 237, the first player's computing system and/or a server computing system can transmit data to other computing systems to cause the communication action(s) to be communicated to other players. For example, a second player's computing system can display the text, "Player 1 suggested to go here," display a marker at the target location, and read aloud the words, "Let's go here," in the voice of the first player's character. The transmitted data can identify locally stored audio and/or visual data on computing systems of the other players to be communicated to the other players. The transmitted data can additionally or alternatively include the actual audio and/or visual data to be communicated.

At block 239, a version of the communication action can be indicated to the first player. For example, a textual notification can indicate to the first player that the first player performed a certain communication action to other players. As another example, the text, "You suggested to go here" be displayed to the first player and a visual marker can indicate the target location suggested by the first player.

The process 200 for selecting, sending, and performing contextually aware communication actions can be subsequently initiated again when the first player provides the user input indicating the user's desire to send a subsequent contextually aware communication. The same user input, such as a press of the same button, can be the user input that is received. In response, a subsequent communication action that is different from the previous communication action can be determined based on the subsequent state of the game, which can be different from the previous state of the game. The subsequent communication action can then be communicated to the other players.

Example Communication Actions for Unit Types

FIG. 3A and FIG. 3B show an example table 300 and continued table 350 illustrating priority tiers of units and associated communication actions. The associations can be set in code, a database, properties of objects, or any other type of structure. The tables 300, 350 include a priority tier 301, a description 303 about which unit types are included in each priority tier, examples of unit types 305 included in each priority tier, communication actions 307 including visuals 309 and audio 311 associated with each unit type, a threshold distance from target location 313 associated with each unit type, visual customizations 315, and audio customizations. The associations shown in FIG. 3A and FIG. 3B can be used, for example, to perform block 230, block 231, block 233, and block 235 of FIG. 2.

Priority

The priority tiers 301 range from 1 to 6, with 1 being the highest priority and 6 being the lowest or default priority. Other priority systems can be used with more or fewer tiers. The priority tiers 301 rank what a player is most likely to want to communicate about. If a player is focusing on a target location that includes a plurality of units of different tiers nearby, then it can be inferred that a player will want to communicate about the type of unit in the highest priority tier. The communication actions 307 can include at least one of a visual action 309 or audio action 311.

The priority descriptions 303 indicate, for example, that a player will most likely want to prioritize spotting dangerous units for the team over communicating about other units in the game, so dangerous units are assigned to priority tier 1. Dangerous units can include enemy characters, explosives, traps, and the like. Recent activity, such as footprints, bullet shells, downed characters, blood, and other evidence of battles can have the next priority 2. Visual markers communicated by the players, such as any of the visuals described in column 309, can be responded to and have the next priority 3. Neutral, interactive units such as doors, portals, ladders, transportation, item containers, non-player characters (NPC's), and the like have the next priority 4. Items for pickup such as weapons, ammo, health, shields, energy, armor, and upgrades have the next priority 5. The last or default priority includes open containers, locations on terrain, and uses of character skills.

The example priority tiers 301 and descriptions 303 are not intended to be exhaustive or limiting. In other implementations, the priority tiers of the unit types can be different. In some implementations, other unit types can include recent units, mobile units, stationary units, interactive units, inactive units, structures, various classes of items and objects, and the like.

Visual Communication Actions

The game data can indicate one or more visual communication actions 309 for each type of unit 305 that can be communicated about. If a first type of unit is selected to be communicated about, then a first type of visual communication action can be performed. If a second type of unit is selected to be communicated about, then a second type of visual communication action can be performed.

For example, a marker or icon can be displayed at the location of the unit to be communicated about. In some cases, the icon can be customized to differentiate the type of unit, such as displaying a crosshair icon for an enemy, an explosion icon for an explosive, a trap icon for traps, and other icons to symbolize other units to be communicated about. For some units, such as doors, ladders, and item containers, the visual action can include outlining and/or highlighting the unit. For items, a representative icon of particular sizes or colors can be displayed at the location of the item based on the type, quantity, and quality of the item.

Some visual actions can include showing a standard marker or icon at a location. Some visual actions can include showing a distance between each character and the unit or location to be communicated about, and the distance seen or heard by each character can be specific to the distance between each respective character and the unit or location. For example, if a first player a target location for the team to go to, then a first marker can be displayed to a first player indicating the target location in the virtual environment and a first distance from the first player's character to the target location, a second marker can be displayed to a second player indicating the target location in the virtual environment and a second distance from the second player's character to the target location, and so on.

If no particular unit is near an area being focused on by a player, then a marker for a terrain location at the target location in the virtual environment can be displayed. The marker can be displayed over the unit to be communicated about both as seen in the virtual environment and additionally or alternatively on a map such as a mini-map or other alternative representation of the virtual environment. The database 300 or other structure can include a plurality of visual indicators 309 to display for respective types of target units 305.

The visuals can optionally be further customized based on the game state. Visuals can be customized by changing sizes, colors, or icons to indicate unit types, quantities, qualities, recent actions, and the like. For example, a marker made for an enemy character can optionally be statically placed at the target location being focused on by a player, statically placed at an enemy character's location near the target location, or dynamically move with an enemy character's location as the enemy character moves through the virtual environment. The icons can dynamically change with the state of the game, for example, by fading or counting down to indicate how recently something happened in the game. Examples of fading and changing icons are illustrated with respect to FIG. 8. Another example includes showing different icons for opened and closed doors. Another example includes outlining an unopened container, not marking item containers opened by a character on the player's team, and marking item containers opened by characters not on the player's team. Another example includes showing an icon marking the player or character who made the communication. Another example includes showing a location icon that also includes a team leader if the communication was made by a team leader during certain parts of gameplay. Another example includes showing different icons when characters are flying instead of walking. The visual icons can be saved as image data in the game data of players' computing systems and retrieved for playback when the communication action is to be displayed.

Another example of customization includes using different visuals to indicate urgency, such as in response to the player's character or an nearby enemy character recently performing attacks. Another example includes using different visuals to indicate distances, such as a dynamically changing distance between a player's character and a marked location. Another example includes using different visuals if a communication is made repeatedly, such as increasing the size or animating the visual to indicate greater urgency.

The visuals 309 can be customized based previous communication actions, such as by changing when repeated or responded to. For example, when communicating about a target location a first time, a marker of a first size and color can be displayed at the target location to other players, and when the same character communicates about the target location a second time shortly thereafter, the marker can animate to increase in size and change color. As another example, a first player's visual location marker can be updated to animate a flash and list the names of other players who made an acknowledgement communication.

The database 300 can include a plurality of visual customization options 315 for types of target units 305. Although FIG. 3A and FIG. 3B illustrate a limited quantity of visual examples, in other examples, any quantity of visuals having any type of customization based on the game state can be used to communicate about any type of in-game unit with any order of priority tiers.

Implementation of Visual Units

A visual marker or icon displayed to other players can be created in a video game as an interface unit. Such interface units can have unique properties and operate differently from other types of in-game units.

For example, interface units can be visible to players on a certain team who make or receive a communication without appearing to players on other teams. The interface units can be configured to simultaneously appear as facing each player looking at the interface unit, such as further described with respect to FIG. 10. The interface units can have no clipping or collisions with other units.

The interface units can be created with a timed lifespan, after which the interface unit can disappear. In some implementations, the timed lifespan can be extended in response to one or more players sending an acknowledgement or confirmation communication action. Some interface units can be subject to removal based on a first-in-first-out queue, such as further described with respect to FIG. 9. Some interface units can be canceled by the player making a communication using the interface unit. Some interface units, such as a marker suggesting a location, can be canceled in response to the player who created the location marker subsequently suggesting an alternative location. Some interface units, such as a location marker, can be configured to disappear for a player once the player's in-game character reaches the location. Some interface units can be visually modified based on responsive communications by other players.

Figure 14A:
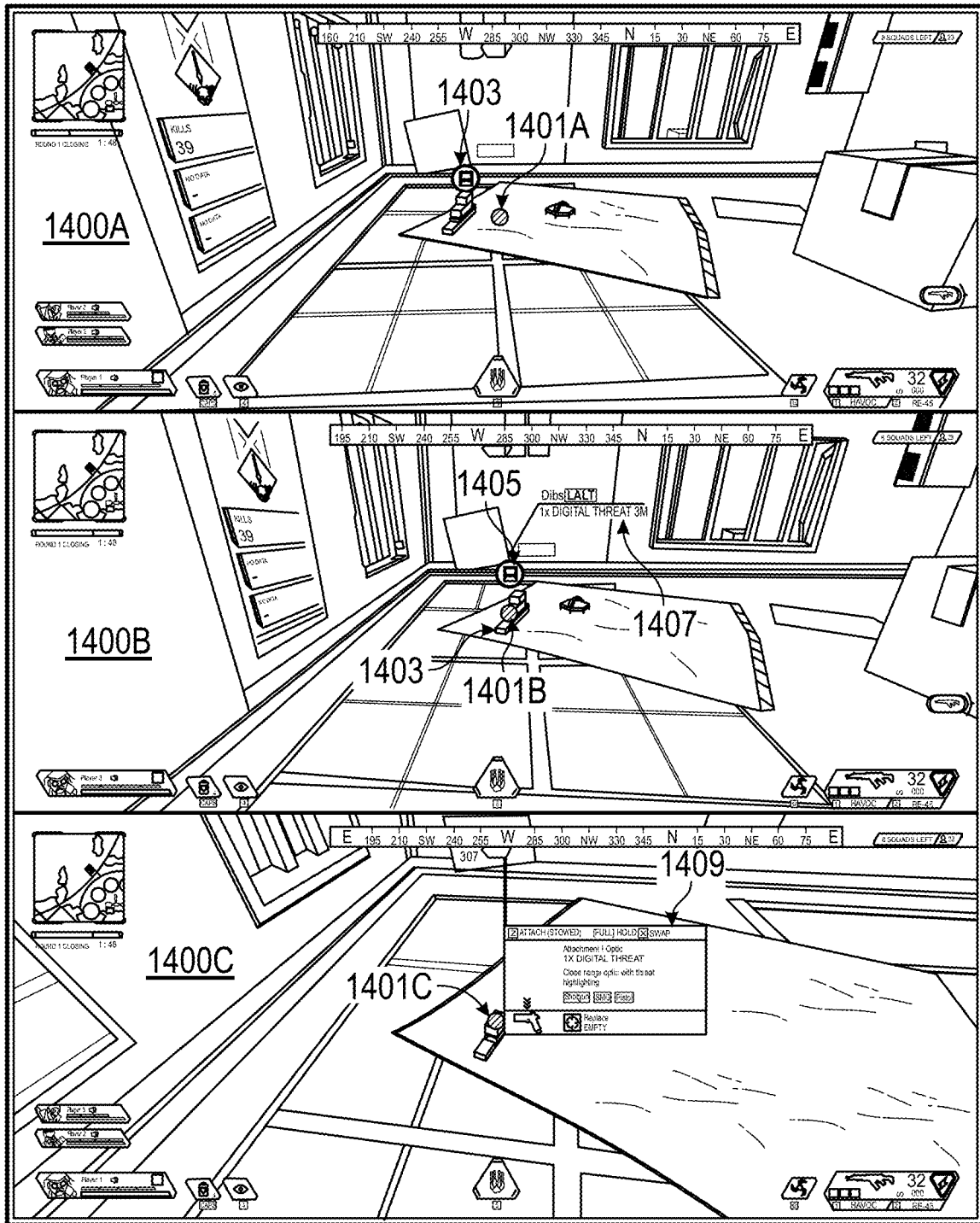
FIG. 14A shows three illustrated screenshots showing various ways that a marker can change based on where a player is focusing and a character's position relative to the marker.
Figure 14B:
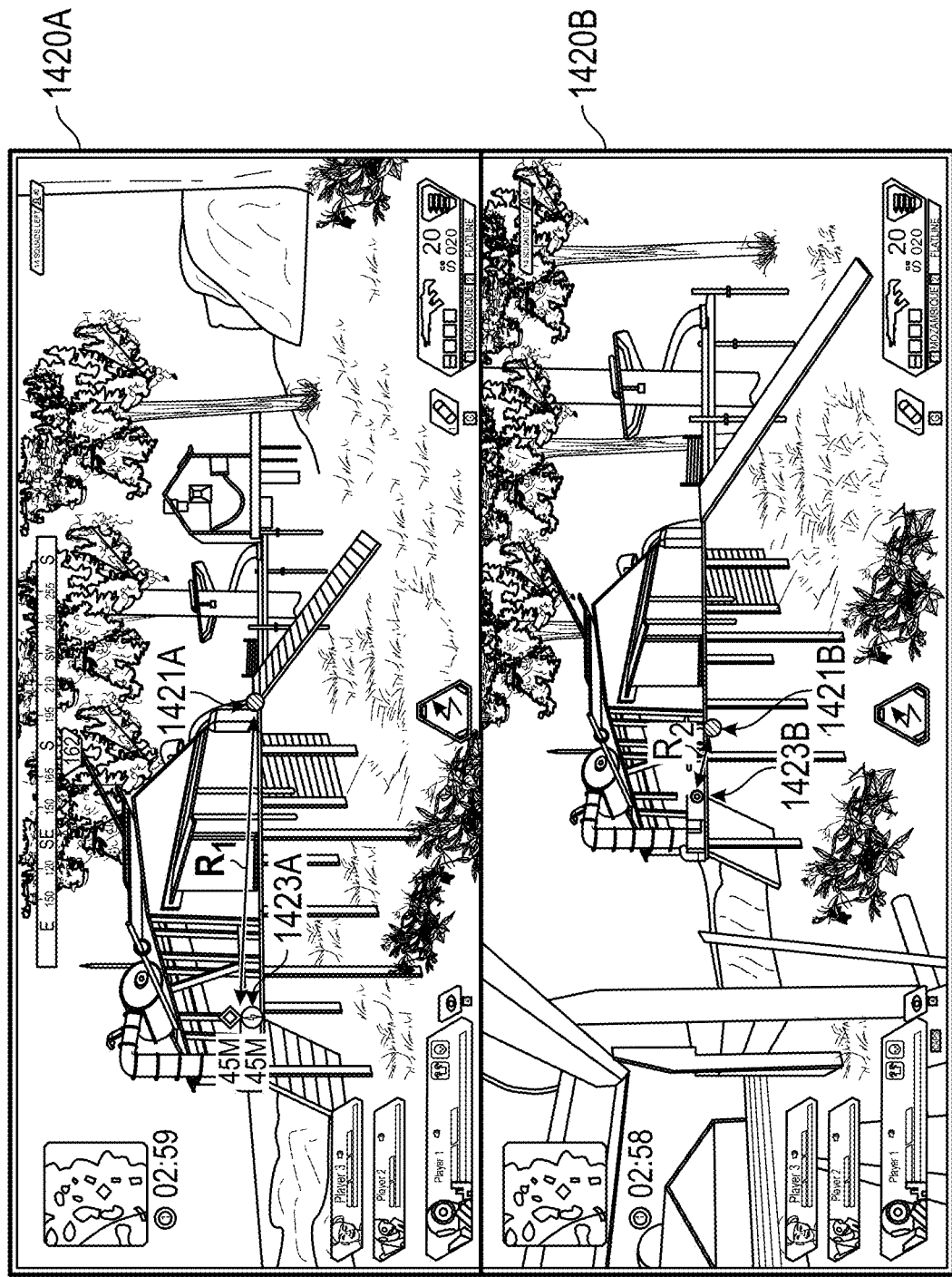
FIG. 14B shows example illustrated screenshots where a marker icon changes based on its distance from where a player is focusing.
Figure 15:
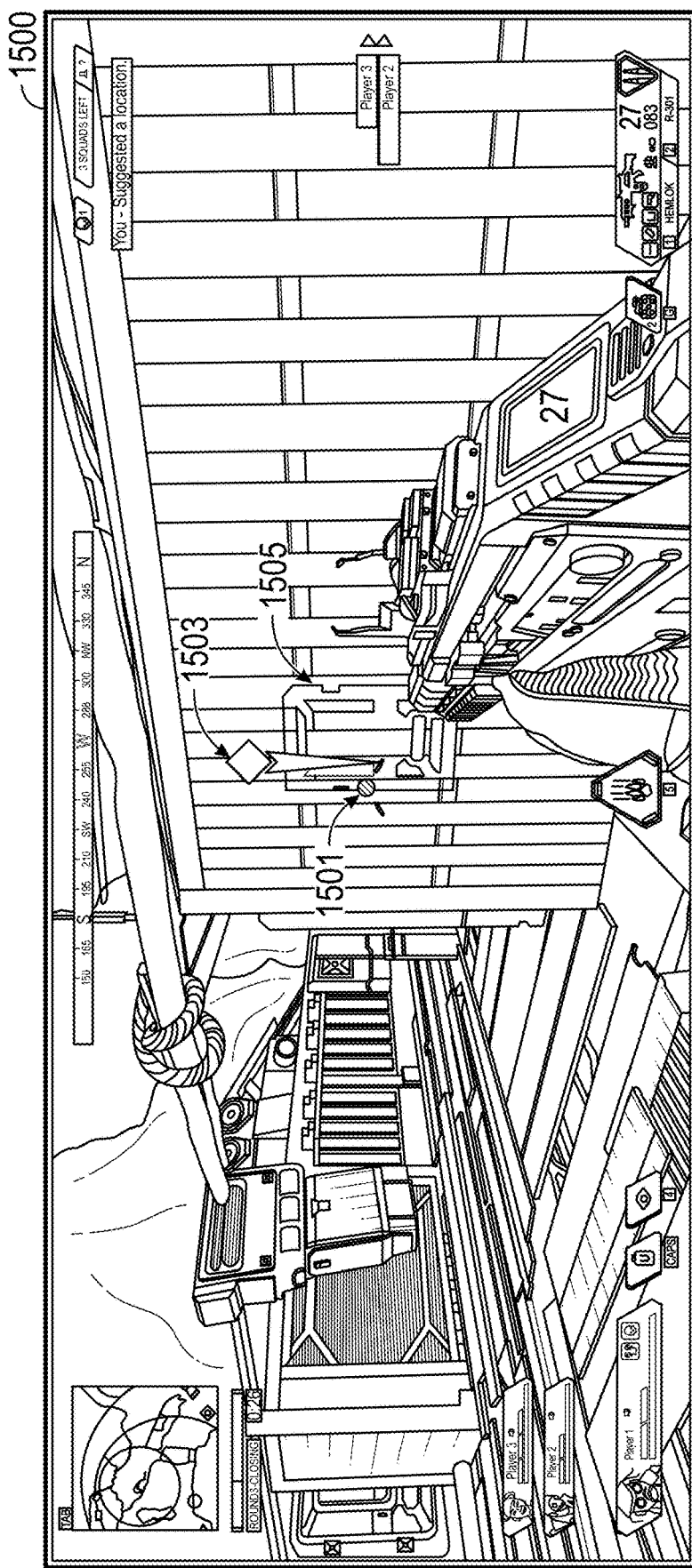
FIG. 15 shows an example illustrated screenshot with a marked door displayed over an opaque intervening object.

The interface units can be visually exposed over intervening opaque objects as seen from players' points of view, such as illustrated in FIG. 15. The interface unit can be configured to disappear based on a state of an underlying, marked unit. For example, a visual icon marking an item can disappear when the item is picked up, and a visual icon marking an enemy can disappear if the enemy is defeated. The interface unit can be configured to change in appearance, such as in size or detail, based on a position of the interface unit relative to an area focused on by the player, such as further described with respect to FIG. 14A and FIG. 14B.

Audio Communication Actions

The game data can indicate one or more audio communication actions 311 for each type of unit 305 that can be communicated about. The audio can include a "ping" sound, various noises, spoken lines, sound effects, music, and the like. If a first type of unit is selected to be communicated about, then a first audio communication action can be performed. If a second type of unit is selected to be communicated about, then a second type of audio communication action can be performed. The audio lines 311 can be spoken or announced by an in-game character based on what is being focused on when a player wants to perform a communication action.

For example, if an enemy character is within the first auto aim distance of or otherwise near a target location when a player wants to make a communication, then the in-game character can announce to a team, "Enemy here," "Enemy spotted," "Watch out for this enemy," or other similar statement, which can vary from character to character.

For some communications, the specific name or type of unit being communicated about can be announced. For example, if a player's character is looking at a shotgun when the player wants to make a communication, then the player's character can say, "Shotgun here." For example, if a player's character is looking at a machine gun when the player wants to make a communication, then the player's character can say, "Machine gun here." If a player's character is looking at a basic body armor when the player wants to make a communication, then the player's character can say, "Body armor here—level 1." If a player's character is looking at an upgraded body armor when the player wants to make a communication, then the player's character can say, "Body armor here—level 3." By default, if a player's unit is not focusing on a target location near any unit that can be commented about, the player's character can say, "Let's go here."

The database can indicate any number of audio communication actions to perform when the player wants to communicate about what the player is focusing on. The example wordings are not limiting, and any other wordings can be used to communicate similar messages. The audio can be saved as data in the game data of players' local computing systems and retrieved for playback when the communication action is to be spoken.

The audio can be customized in various ways based on the game state. The voice reading the audio line can depend on the in-game character that will speak. The words to be spoken can vary based on each in-game character's speaking style. The spoken audio can identify a name or property of a unit that is being focused on. Some characters may provide or more less detail. For example, a first character may say extra details about guns, such as which guns are better or harder to find, in comparison to a second character speaking about the same guns. The second character may specialize in armor and announce more details about armors instead.

The audio can change by sounding more urgent, speaking faster, changing pitch, changing emphasis, and/or using different words under certain situations, such as if speaking about an enemy, if the speaking player's character recently engaged an enemy unit or was under attack, or if low on health. For example, a player's character might say, "Enemy here," if the player is focusing on the enemy, but if the player recently was attacked by the enemy, then the player might announce, "Taking fire from this enemy!"

A character may change what they would otherwise say about a suggested destination by saying, "Let's hurry here—we need to move!" or making some other variation of "Let's go here," if the suggested destination is farther than a threshold distance from one or more or all characters on a team or when sending a contextually aware communication during a part of the game where there is a limited time to reach the location. As another example, a character may change what they would otherwise say about an enemy by saying, "Enemy spotted in the distance," or some other variation of "Enemy spotted," if an enemy is near a target location that is farther than a threshold distance from one or more or all characters on a team.

The database 300 can include a plurality of audio customization options for types of target units 305. Although FIG. 3A and FIG. 3B illustrate a limited quantity of audio examples, in other implementations any quantity of visuals having any type of customization based on the game state can be used to communicate about any type of in-game unit with any order of priority tiers. For example, audio communication actions can include identifying a target unit, announcing a name of the target unit, announcing a distance to the unit, announce an action to perform with respect to the target unit, announcing what the target unit just did, announcing a state or property of the target unit, announcing what the unit is used or designed for, and the like.

Other Communication Action Details

Although not separately illustrated in FIG. 3A or FIG. 3B, different text notifications can additionally or alternatively be visually displayed to other players when a first player is focusing on the respective unit types and wants to communicate. The text communications can be the same as or similar to the audio communications, except displayed as text instead of being played aloud. For example, if a first player is focusing on a distant location and presses a button to communicate, then a marker can be displayed on the screens of the first and second player, a first character controlled by the first player can announce, "Let's go here," to the first and second player, and a text message can appear on the screens of the first and second player stating, "Player 1 suggested a location."

Although not separately illustrated in the static drawing of FIG. 3A or FIG. 3B, the visual communications can also include different dynamic animations for different unit types. The communication actions 307 can be based on previous communication actions, such as by changing when repeated. For example, when communicating about a target location a first time, a character might say, "Let's go here," and when the same character communicates about the target location a second time shortly thereafter, the character might say more urgently, "Let's move here, NOW!" As another example, when communicating about an enemy a first time, a character might say, "Enemy spotted," and when the same character communicates about the target location a second time shortly thereafter, the character might yell, "Fire on the enemy!"

Different communication actions may be available to different characters in a game. In an example game, a player can only see and communicate about footprints if the player has selected particular characters that have target tracking abilities, and players playing as other characters may not see or be able to communicate about the footprints. Some players can unlock or customize different voice lines. For example, a player may be able to change the voice line from, "Let's go here," to "Move here," by selecting an option through an in-game menu. Similarly, players can unlock or customize different visual communication actions.

Threshold Distances

FIG. 3A also illustrates associations between threshold distances to a target location and unit types. As further described with respect to FIG. 2, FIG. 4, FIG. 5A, and FIG. 5B, the target location, priority tiers, and threshold distances can be used to determine which unit a player is focusing on and likely wants to communicate about. The threshold distance column 313 indicates different threshold distances for the various types of units 305. If a unit is beyond the threshold distance 313 from the target location, then a player can be determined to be uninterested in communicating about the unit. From among units within the threshold distance from the target location for each unit type, a player can be determined to want to communicate about the highest priority unit that is closest to the target location. The threshold distance can be any measurement unit, such as meters, pixels, any distance unit used in a virtual environment, 2D tiles, 3D blocks, and the like.

The threshold distances 313 can vary for different unit types. For example, units of a first unit type may be considered for communication if those units are within a first threshold distance from a target location that a player is focusing on, and second units of a second unit type may be considered for communication if those second units are within a second threshold distance from the target location that a player is focusing on. Some distances for some unit types can be zero. For example, the player can be determined to want to communicate about the location zero units of distance away from the target location that the player is focusing on if no other units are within their respective threshold distances. A player can be determined to want to communicate about certain types of units whose hitboxes overlap a target location that the player is focusing on. In some implementations, fewer quantities of threshold distances can be used and a single threshold distance can be used for all types of units.

Some threshold distances can be set to an auto aim distance. For example, a video game may have an auto aim function that automatically aims or improve the aim of a weapon or projectile if a target is or was recently within a threshold distance from manually aimed location. In some games, the auto aim distance can dynamically change during gameplay, such as when a character changes weapons. As an example distance threshold for communications, a player can be determined to want to communicate about an enemy unit that is being auto-aimed at.

The examples shown in FIG. 3A and FIG. 3B are exemplary only and not intended to be complete or limiting. Any quantity or order of priority tiers, unit types, visuals, audio, customizations, and/or threshold distances can be implemented in video games. In some implementations, threshold distances to active or moving units can be larger than threshold distances to inactive or stationary units. In some implementations, the threshold distance to enemies, mobile units, and/or dangerous units can be relatively larger. In some implementations, immobile items and/or terrain locations can have shorter threshold distances and/or require that the target location hit the item's hitbox or a terrain location.

Determining the Unit to Communicate about

Figure 4:
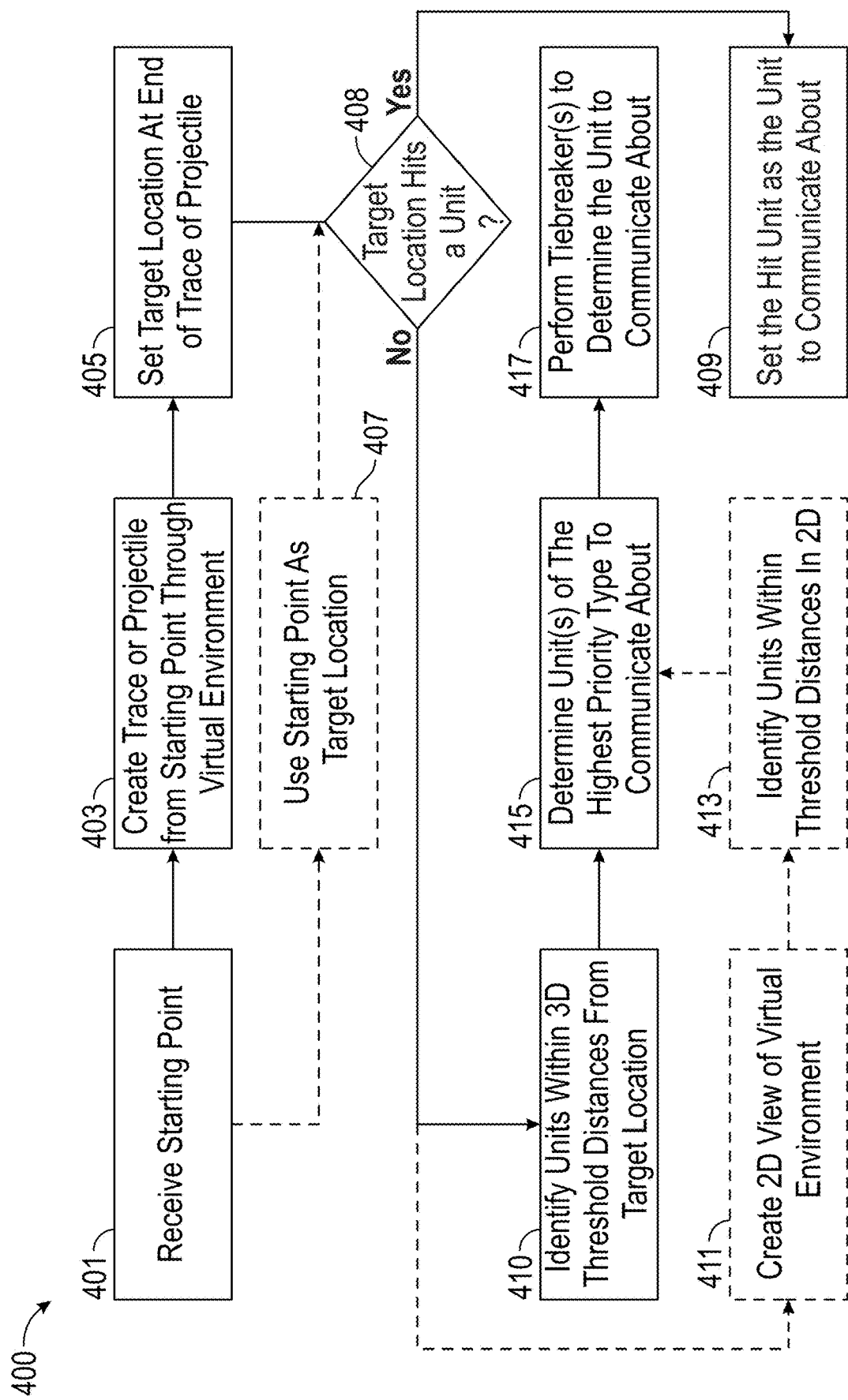
FIG. 4 shows an example flowchart of a process for determining a unit to communicate about.

FIG. 4 shows an example flowchart of a process 400 for determining a unit to communicate about. The process 400 in FIG. 4 can be used, for example, during the block 230 described with respect to FIG. 2. The process 400 generally identifies where a player is focusing, identifies any items within the area of focus, and identifies a highest priority item as the item to be communicated about.

At block 401, a starting point can be received. The starting point can be, for example, a cursor, a center of a player's field of view in a screen, a weapon or item being aimed by a player's character, and the like. Some examples are further described with respect to FIG. 5A.

At block 403, a trace or projectile can be created from the starting point through the virtual environment. For example, a trace can be projected straight forward from the center of a player's field of view to determine where the player is focusing. As another example, a trace can be projected from the barrel of a weapon to determine an aimed location that the player is focusing on. Alternatively, a projectile path can be calculated, such as from the barrel of a weapon or where an item will be thrown. The projectile path can be nonlinear and account for simulated effects of gravity, wind, and the like.

At block 405, a target location can be set at the end of the trace or projectile path. The target location can be any location in the virtual environment where the player is focusing and includes units nearby that the player may want to communicate about.

In some cases, block 407 can optionally be used to set the starting point as the target location instead of blocks 403 and 405, especially when used with a 2D interface. For example, as further described with respect to FIG. 17, the cursor can both act as the starting point and indicate the target location without any trace or projectile.

At block 408, it can be determined whether the target location hits a unit. Block 408 can optionally determine whether the target location hits a unit of at least a threshold priority level or a unit associated with a hitbox threshold distance or zero threshold distance. For example, at block 408, it can be determined whether the target location hits a unit having a priority level of 1-5. If so, then block 408 can proceed to block 409, otherwise block 408 can proceed to block 410. Block 411 can be used as an optional alternative to block 410.

At block 409, the unit at the target location can be set as the unit to communicate about.

At block 410, items within a 3D threshold distance from the target location can be identified. Different types of items and/or items of different priorities can be identified if they are within respectively assigned threshold distances, such as those illustrated in column 313 of FIG. 3A. For example, items of a first type may be identified for consideration if they are within a first threshold distance of the target location, and items of a second type may be identified for consideration of they are within a second threshold distance of the target location.

At block 415, from among the units within the respective threshold distances, units of the highest priority can be determined. The priorities of different units can be assigned inherently or explicitly, such as illustrated in FIG. 3A.

Blocks 410 and 415 can be combined and implemented in a variety of ways and sometimes together or in reverse order. In some implementations, blocks 410 and 415 can be combined. For example, a first search can be performed for any highest priority units within their respective threshold distances from the target location, and if none are found, then subsequent searches can be performed for items of subsequent priority tiers within their respective threshold distances from the target location until at least one item is found. In an alternative implementation, all items are first identified within one or more respective threshold distances. Then, among the identified items, a second search can be performed to determine which of those items are of the highest priority.

If one unit is identified as having a higher priority tier than other units within their respective threshold distances from the target location, then the one unit can be set as the unit to communicate about.

One or more tiebreakers can be performed at block 417 if a plurality of units are identified and none of those units have a uniquely highest priority tier. One example of a tiebreaker includes determining which of the units are the closest to the target location. Another example of a tiebreaker includes determining if any of the units has been most recently interacted with or performed an action. Another example of a tiebreaker includes determining which of the target units are closer to the player's character. Other tiebreakers and/or any combination of tiebreakers can be performed at block 417.

As an alternative to block 410, blocks 411 and blocks 413 can optionally be performed for 2D implementations. At block 411, a 2D view of the virtual environment can be created. Some menus (such as the menus shown in FIG. 17) are already displayed in 2D and well suited for an implementation according to block 411. Some games are played in a 2D view that can also be reused in block 411.

At block 413, units within respective 2D threshold distances from the target location can be identified.

If no units are identified at the target location at blocks 410 or blocks 413, then a default unit type or location on a terrain of the virtual environment can be used as the unit to communicate about.

Example Target Location and Threshold Distances

Figure 5A:
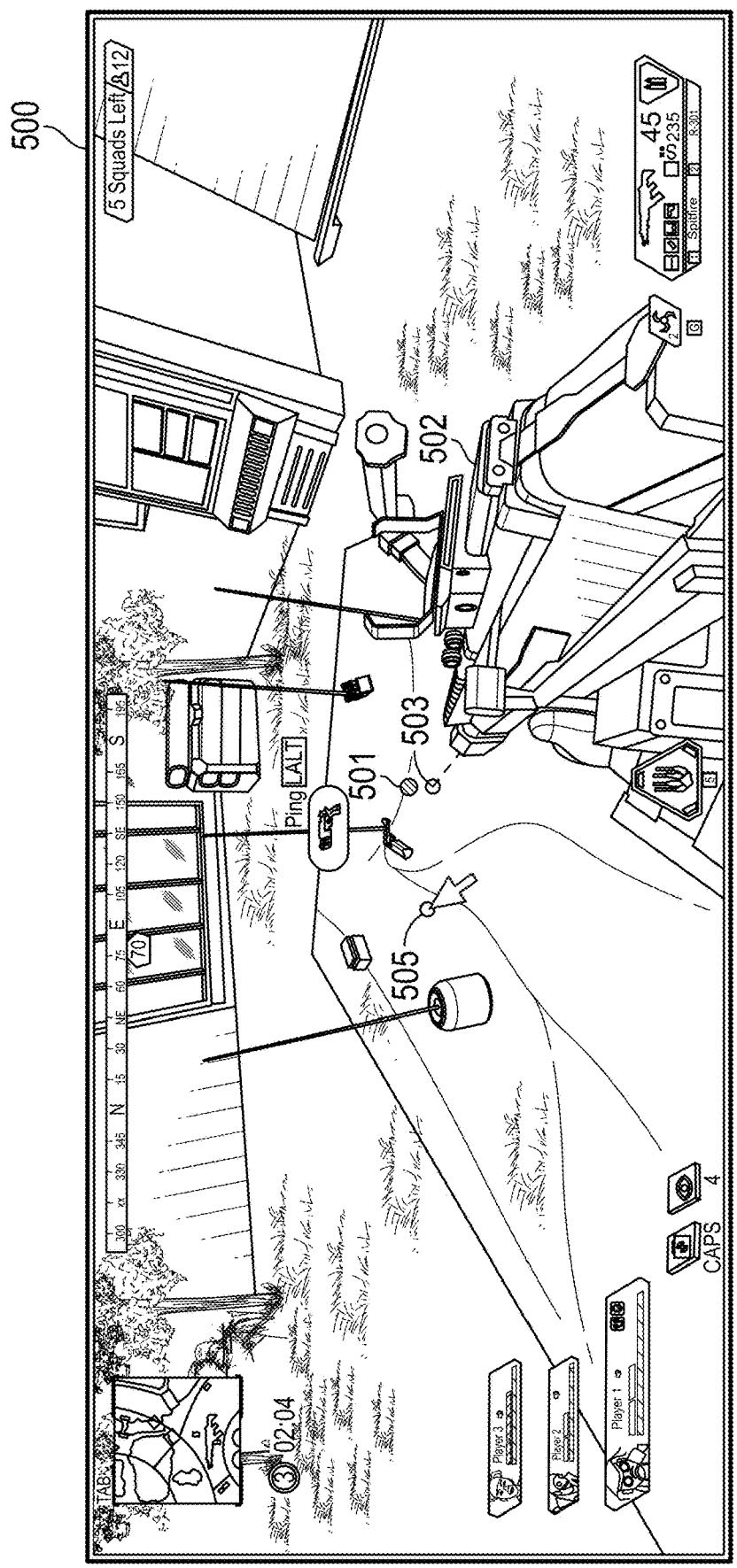
FIG. 5A shows an example illustrated screenshot of a player's field of view in which target locations can be determined.

FIG. 5A shows an example illustrated screenshot 500 of a player's field of view in which target locations can be determined. The illustration 500 shows a first-person perspective of a virtual 3D environment in the game as displayed to the player. The illustration 500 has a center 501 and shows a weapon 502 pointing at location 503 and a cursor tip location 505.

The center 501, weapon 502, cursor 505, or any other reference can be used as the starting point discussed with respect to block 401 of FIG. 4. The target location can be any part of the virtual environment at the end of a trace or projectile originating from the starting point. For example, the target location can be set as the location 501 on the canvass in the 3D environment hit by a linear trace projected straight forward from the center of the screen. As another example, the target location can be set as the location 503 on the canvass being aimed at by the weapon 502. The aimed location can be traced or calculated as a non-linear projectile path, such as to account for gravity causing bullet drop, wind, or other effects. As another example, the target location can be set as the location 505 on the canvass at the end of the cursor 505. Any of these target locations can be used for determining units or locations that a player may want to communicate about. A player can control the mouse 505 and move the in-game character within the 3D environment of the game as the player focuses on different targets within the game. The player can also aim the weapon 502 as the player focuses on different targets within the game, and the target location can optionally account for recoil of the weapon 502 and/or non-linear projectile paths extending from the weapon 502.

Other examples can include setting a target location based on where an in-game character is looking, where a projectile (including arcing projectiles paths launched from weapons) will land, an objective recently highlighted on a user interface, and the like. In some examples, the trace or projectile can be extended in other directions. For example, a trace or projectile can be extended sideways in 2D side scrolling shooters or in 3D games. In some cases, the end of the cursor can be used as the target location, such as in video games played over a flat interface or even in 3D games.

Figure 5B:
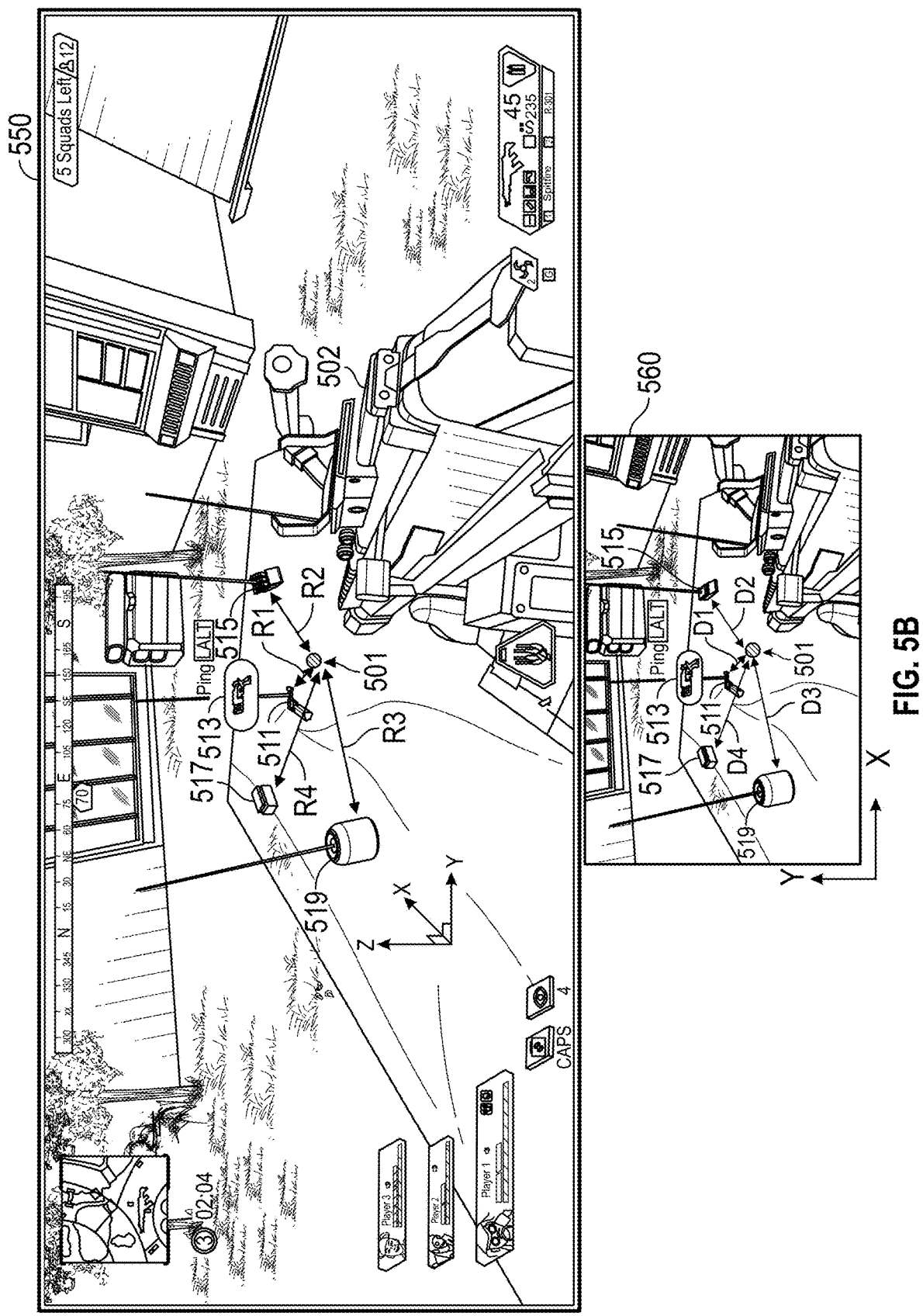
FIG. 5B shows an example illustrated screenshots of a player's field of view with examples of 2D and 3D threshold distances.

FIG. 5B shows example illustrations 550, 560 of the gameplay from the player's perspective from the video game in which target locations can be determined. The illustration 550 includes target location 501, a pistol 511, a pistol icon 513, a first ammo box 515, a second ammo box 517, an energy cell 519, 3D distances R1, R2, R3, and R4 measured from the target location 501 according to an <X, Y, Z> axis. The illustration 560 shows alternative 2D distances D1, D2, D3, and D4 measured from the target location 501 according to an <X, Y> axis.

The distance R1 is a 3D distance in the 3D environment between the target location 501 and the pistol 511. The distance R2 is a 3D distance in the 3D environment between the target location 501 and the first ammo box 515. The distance R3 is a 3D distance in the 3D world between the target location 501 and the second ammo box 517. The distance R3 is a 3D distance in the 3D world between the target location 501 and the energy cell 519.

In some games, the 2D distances D1-D4 can be used instead of the 3D distances. In some cases, calculating 2D distances can be more efficient, such as if a game environment takes place in a 2D virtual world or units are already tracked using a 2D coordinate system.

A communication module of a computer system can determine that a player is considering items within respective threshold distances as potential items for communicating about. According to the example database 300 in FIG. 3A, the pistol and ammo boxes are considered as potential units to communicate about if the distances R1, R2, and R3 are less than the fifth threshold distance, and the energy cell 519 is considered to be a potential item to communicate about if the distance R4 is less than the sixth threshold distance.

If more than one candidate item is within its respective threshold distance and none of the items have a higher priority, then the item that is the closest to the target location 501 and/or more recently interacted with can be selected as the item to communicate about. Other tiebreakers can additionally or alternatively be used. In the illustrated example in FIG. 5B, the pistol 511 is the closest to the target location 501. Accordingly, during gameplay, the icon 513 is shown above the pistol 511 to inform the player that pressing the communication button will cause a visual or audible message to be communicated to other players regarding the pistol 511. The icon 513 can be accompanied by the text "Ping LALT" to let the player know to press the left alt button on the keyboard to provide the user input for sending a contextually aware communication to other players about the pistol 511.

The icon 513 can dynamically change as the player interacts and focuses on different parts of the virtual environment. For example, in response to receiving user movement input, if the player's character turns slightly to the right such that the target location 501 is moved to be closer to the ammo box 515 than the other items, then the distances R1-R4 can be recomputed, and an icon can appear over the ammo box 515 instead of over the pistol 511 to let the player know that pressing the communication button will cause a visual or audible message to be communicated to other players about the ammo box 515. Accordingly, a game engine can repeatedly determine the target location, calculate and compare distances of nearby units to respective threshold distances, and update the item to communicate about in accordance with the comparison results and priorities in real time as the game progresses in response to receiving user inputs that change where a user is focusing on.

Example Container and Items

Figure 6:
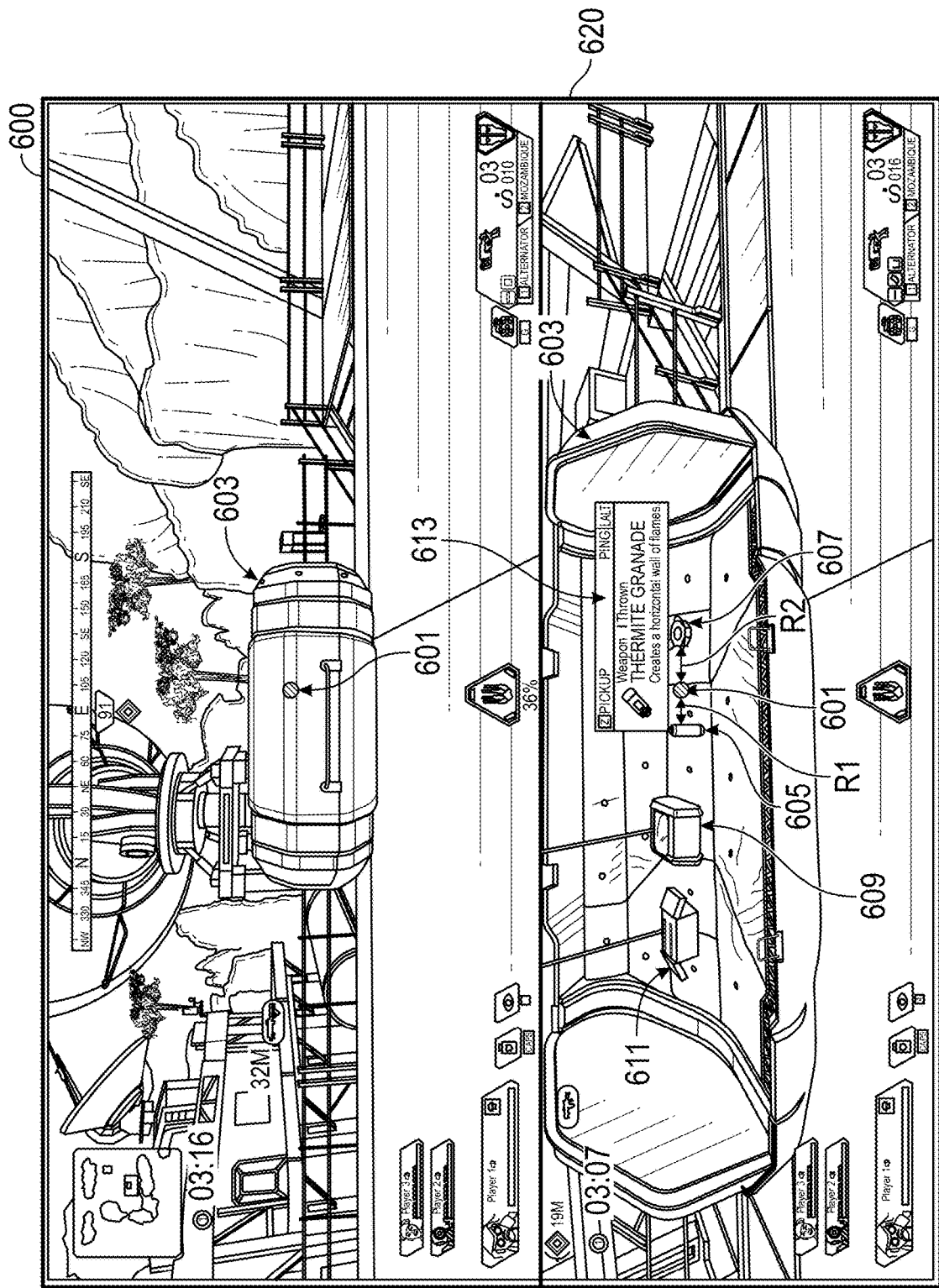
FIG. 6 shows two example illustrated screenshots of a player's fields of view demonstrating dynamically changing selections of an item to communicate about.

FIG. 6 shows two example illustrated screenshots 600, 620 of a player's fields of view demonstrating dynamically changing selections of an item to communicate about. In the top illustration 600, a first player is approaching an unopened item container 603. In the bottom illustration 620, the player has approached and opened the item container 603.

In the top illustration 600, the first player approaches the item container 603 while the center of the screen is used to trace a projection to target location 601. The trace hits the unopened item container 603. According to the example database 300 in FIG. 3A, if the first player were to provide the user input button to send a contextually aware communication, then the item container would be outlined for other players on the team, and the first player's character would announce to other players, "Looking for items here," based at least in part on the target location hitting the hitbox of the unopened item container.

In the bottom illustration 620, the player has approached and opened the item container 603 while still maintaining the position of the center of the screen. An ammo box 611, backpack 609, thermite grenade 605, and upgrade item 607 are inside the item container 603. A trace projects to target location 601 hitting the opened container. The thermite grenade 605 is a distance R1 away from the target location 601, and the upgrade item 607 is a second distance R2 away from the target location 601.

According to the example database 300 in FIG. 3A, the open item container 603 has the lowest or default priority. Before defaulting to setting the opened item container as the item to be communicated about, a computer system can first determine if any other unit types of higher priority tiers are within respective threshold distances. According to the example database 300 in FIG. 3A, the items for pickup have priority tier 5. Among the items 605, 607, 509, and 611, only the thermite grenade 605 and the upgrade item 607 are within the respective threshold distances to be considered as the item to be communicated about. If distance R1 is smaller than distance R2, then the thermite grenade can be identified as the item to be communicated about if the player were to provide the user input for sending a contextually aware communication. Although the target location 601 hits the hitbox of the open item container 603, the open item container is not selected as the item to communicate about because it has a lower priority than the items inside.

An informational box 613 can be created as a unit during gameplay providing details about the thermite grenade 605. An icon for the thermite grenade 605 is shown to inform the player that pressing the communication button will cause a visual or audial message to be communicated to other players regarding the thermite grenade 605. The icon can be accompanied by the text "Ping LALT" to let the player know to press the left alt button on the keyboard to ping other players about the thermite grenade.

Example Marker at Target Location

FIG. 7 shows an example illustrated screenshot 700 of a player's field of view when making a contextual "enemy spotted" communication. In the illustration 700, a player is focusing the center of the screen near an enemy unit 705 and provides a user input indicating a desire to send a contextually aware communication. The computer system determine that the enemy unit 705 is beside and within a threshold distance from the target location 701 that is at the end of a trace from the center of the screen.

As a real time response to the player providing the user input to send the contextually aware communication, a marker 703 is displayed at the target location 701 for other teammates to see. Additionally or alternatively, the player's character can announce to his teammates, "Enemy spotted," or a similar line. Additionally or alternatively, text 707 at the top right of the screen can be displayed to the player, "You spotted an enemy," and text can additionally or alternatively be displayed to the player's teammates indicating that the player has spotted an enemy.

In some examples, the marker 703 can be statically displayed at the target location 701. In some examples, the marker 703 can be statically displayed at the location of the corresponding enemy unit 705. In some examples, the marker 703 can dynamically move with the enemy unit 703 as the enemy unit 703 moves throughout the environment for a threshold time duration and optionally while the enemy unit remains within a line of sight 703.

Example Time Variant Markers

FIG. 8 shows example illustrated screenshots 800, 820 of a player's fields of view with time variant units that can be communicated about. The screenshots show a target location 801 hit by a trace projected forward from the center of the screen, first markers of recent enemy movement 803A, 803B, second markers of recent enemy movement 805A, 805B, and a third marker of empty shells 807A, 807B. The top screenshot takes place first, and the bottom screenshot takes place after the player provides a user input for making a contextually aware communication.

In the top screenshot, the markers 803A and 805A indicates that an enemy recently jumped at the respectively marked locations. The markers 803A and 805A can be created as a user interface unit. In some cases, only certain characters in the game can see the markers 803A, 805A, and 807.

The markers 803A, 805A, and 807A can change as time progresses to indicate that the marked events occurred longer ago. For example, the icon at 803A has a more complete border than the icon at 805A to indicate that an enemy unit jumped at the location 803A more recently than at the location 805A. The border of 805A can also change to the border of 805B and fade to a lighter color as time elapses. The marker for empty shells 807 can include a timer indicating how long ago the shells were dropped on the ground.

Any of the markers 803A, 805A, and 807A can be identified as a unit to be communicated about. The markers 803A, 805A, and 807A can have a priority and threshold distance. The threshold distance of the ammo shells 807 can be taken between the target location 801 and the ammo shells or taken between the target location 801 and the any part of the interface unit attached to the ammo shells 807, such as to the icon, text, or lead line.

In the illustrated example, the marker 803A is the closest unit to the target location 801. In response to a player providing the user input to send a contextually aware communication, a new marker 803B is displayed to other players to indicate the original location of 803A. The player's character can also announce, "Someone jumped down here seconds ago," to other players. A text message of similar effect can also be displayed to the other players. In some examples, a time variant icon similar to 803A can be displayed to the other players as part of sending a contextually aware communication.

Example Ping Icons on Items

Figure 9:
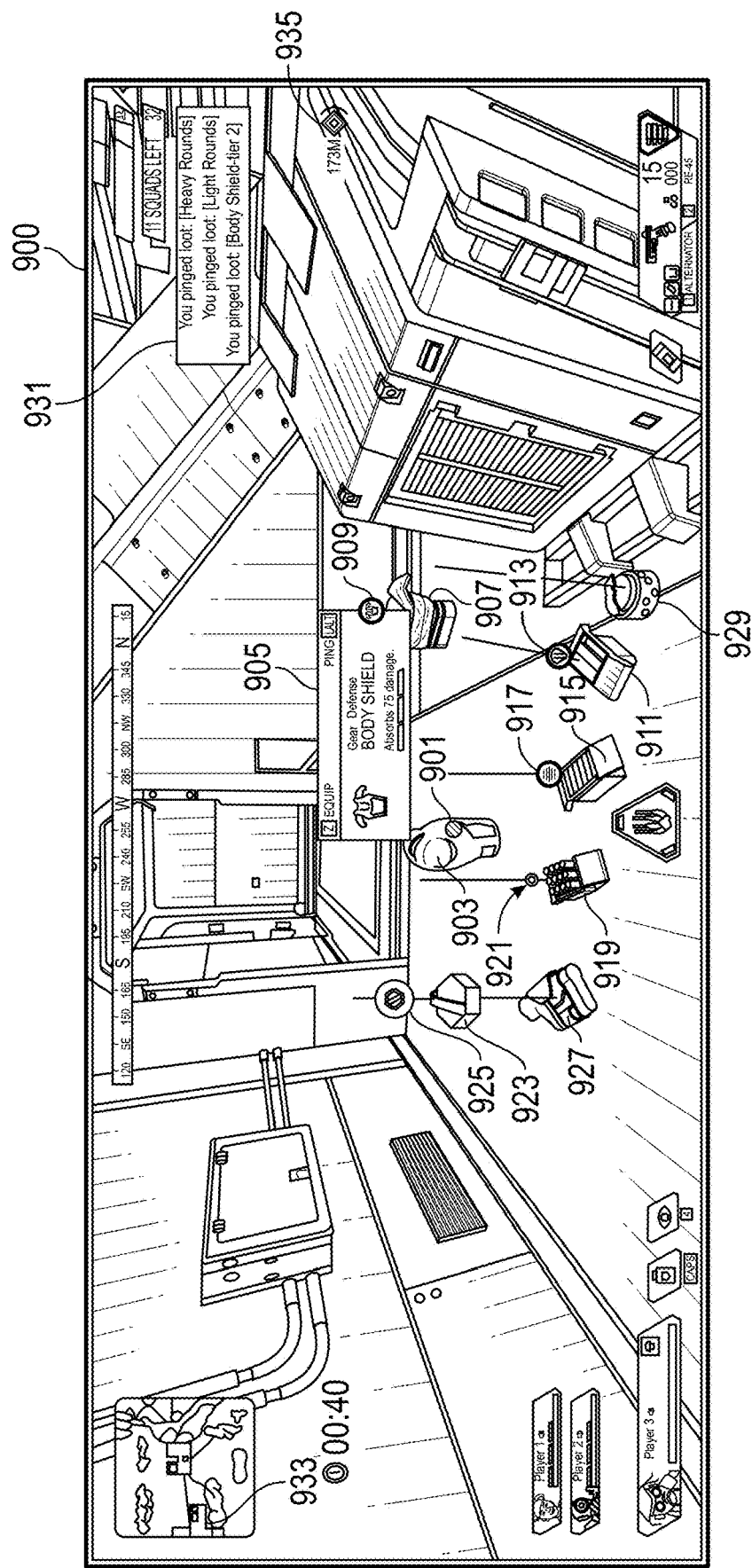
FIG. 9 shows an example illustrated screenshot of a player's field of view with ping icons indicating the locations of various items.

FIG. 9 shows an example illustrated screenshot 900 of a player's field of view with ping icons indicating the locations of various items. FIG. 9 includes a target location 901 at a projection from the center of the screen, a tier 2 body shield 903, an informational box 905, a tier 1 body shield 907, an icon 909 for the tier 1 body shield, an icon 913 marking the location of a box of heavy ammo 911, an icon 917 marking the location of a box of light ammo 915, a diminishing icon 921 that was marking the location of a box of shotgun ammo 919, an icon 925 marking the location of a knockdown shield 923, a sniper stock 927, and a grenade 929. A text box 931 logs a limited quantity of recent history of communications. A minimap 933 shows a layout of the virtual environment in which the video game takes place.

The various items 903, 907, 911, 915, 919, 923, 927, and 929 can be focused on by the player and communicated about by providing the user input for sending contextually aware communications. In the illustrated example of FIG. 9, the player has sent contextually aware communications about or "pinged," in sequence: the shotgun shells 919, the heavy ammo 913, and the light ammo 917. The respective icons 921, 915, and 917 are displayed to the player's teammates. The player is now pinging the body shield 903.

The video game engine can be configured to track the pings of each player using a first-in-first-out ("FIFO") queue that has a limit on a maximum quantity of outstanding pings that a player can make at one time, such as three, four, or any other quantity. In the illustrated example, the FIFO queue allows for three pings, so as the player pings the body shield 903 as the fourth item, the icon 921 for the shotgun shells shrinks and disappears. In some examples, markers can also appear and disappear at items' respective locations on in the mini-map 933 when a contextually aware communication is made.

The visual markers of pinged items, such as icons at the item locations, can disappear under multiple conditions. Some markers can disappear after a timeout duration. Some markers can disappear when the underlying unit disappears. For example, a visual icon marking an item can disappear when the item is picked up, and a visual icon marking an enemy can disappear if the enemy is defeated. Some markers placed by a first player can disappear when acknowledged by a second player, canceled by the first player, or when an alternative is suggested by the first player. Configuring markers to expire in various ways helps to avoid obscuring players' fields of view.

Other teammates have pinged the tier 1 body shield 907 and the knockdown shield 923. Accordingly, the respective icons 909 and 925 are visible to the player. The other teammates have also pinged a unit outside of the screen towards the right. As a result, a marker 935 is displayed on the right side of the player's screen indicating the direction of the pinged unit towards the right and the dynamically customized distance 173 meters away.

Player Facing Icons

Figure 10:
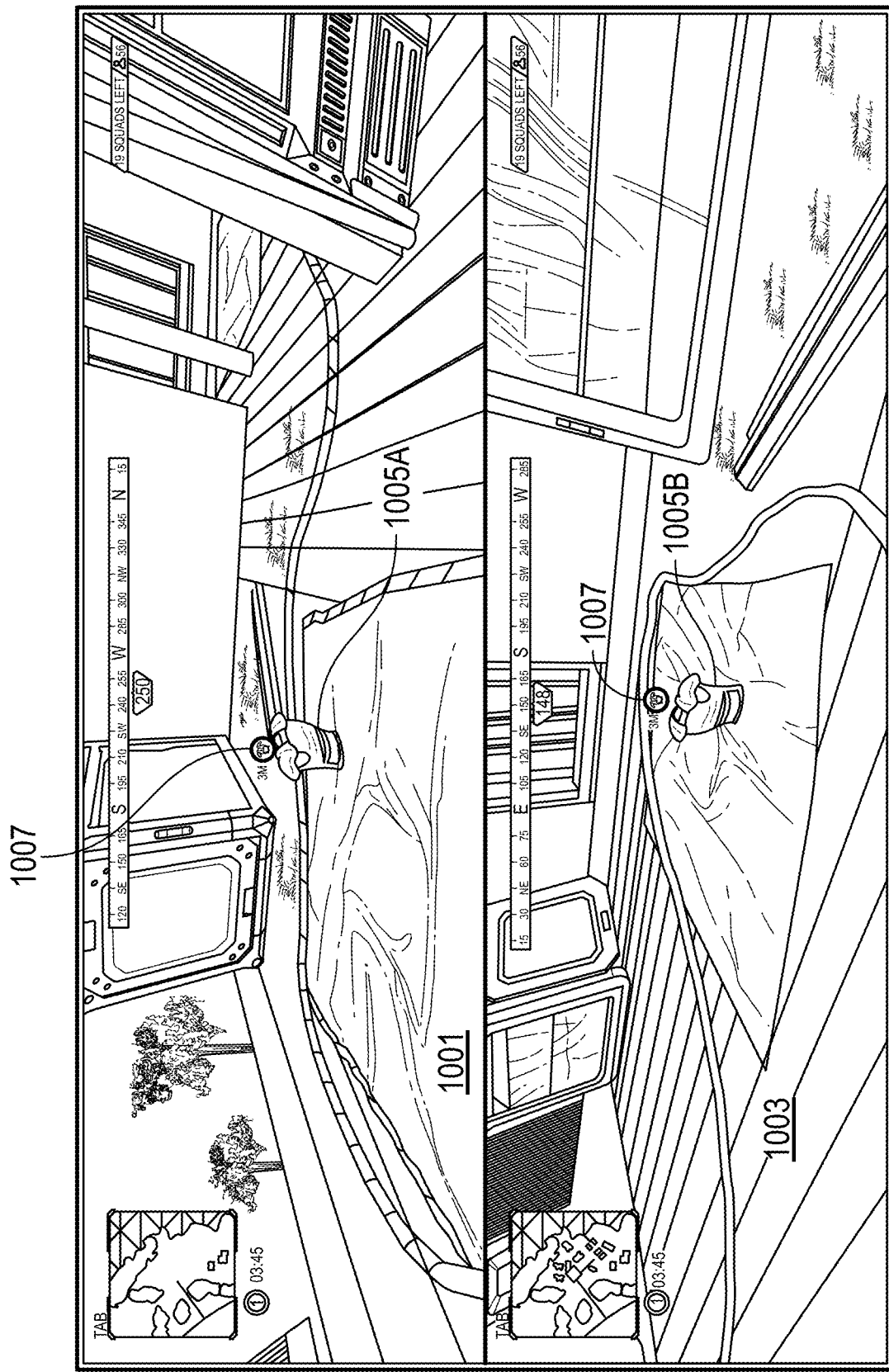
FIG. 10 shows two illustrated screenshots of a body shield as simultaneously seen from perspectives of two different players.

FIG. 10 shows two illustrated screenshots 1001, 1003 of a body shield as simultaneously seen from perspectives of two different players. In the first screenshot 1001, a first player sees the body shield 1005A from a first perspective. In the second screenshot 1003, a second player sees the body shield 1005B from a second perspective. The body shield is shown to the first and the second player based on their respective 3D positions relative to the body shield in the virtual environment of the video game.

A third teammate had pinged the location of the body shield, causing an icon 1007 to appear at the location of the body shield for both the first player and the second player to see. The icon 1007 can continuously face the players regardless of which angle the first and second players observe the icon from. Accordingly, the icon 1007 can behave similarly to an overlay or interface display element that continuously faces the players.

Responsive and Dynamic Icons

Figure 11A:
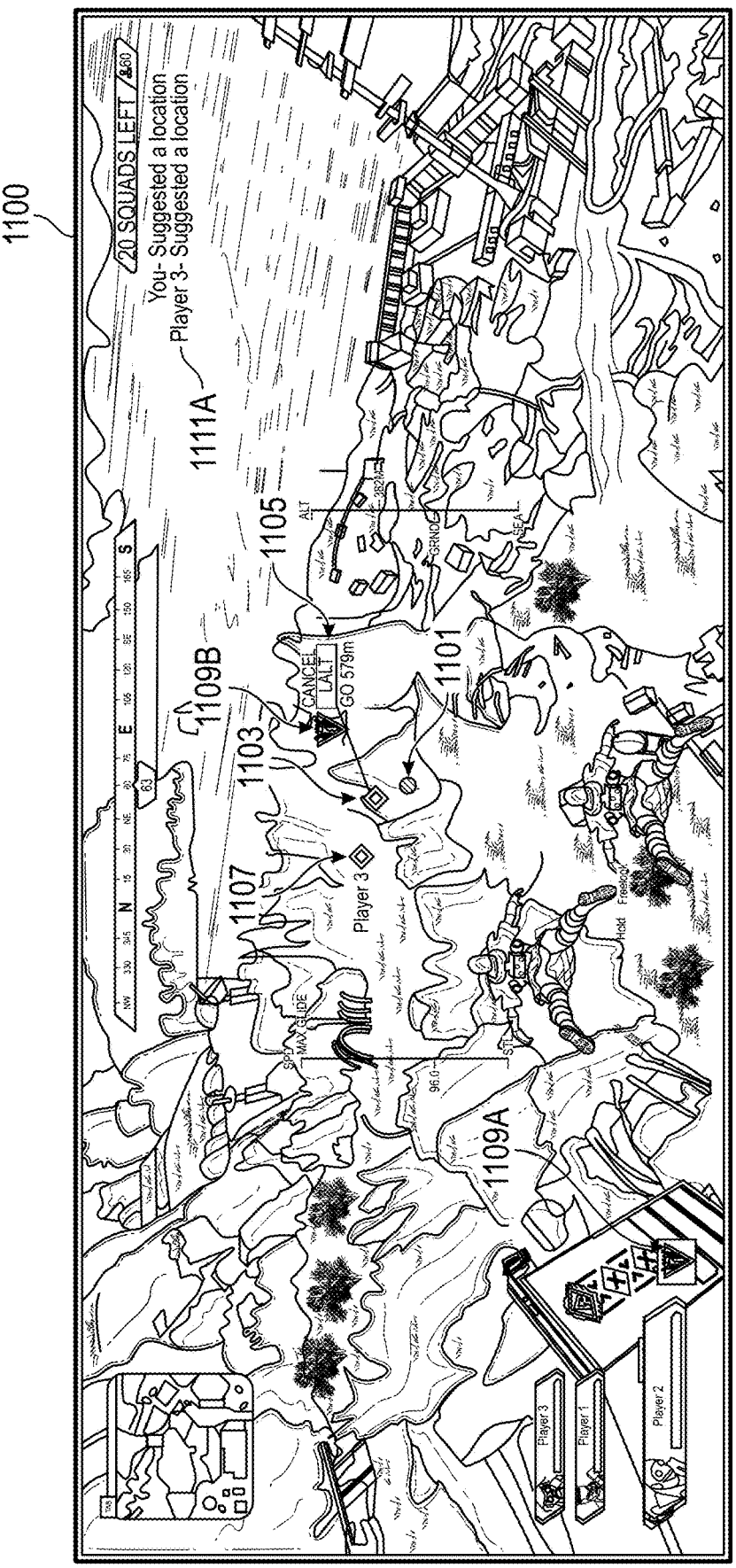
FIG. 11A shows an example illustrated screenshot of player 2's field of view in a video game before player 1 sends an acknowledgement ping.
Figure 11B:
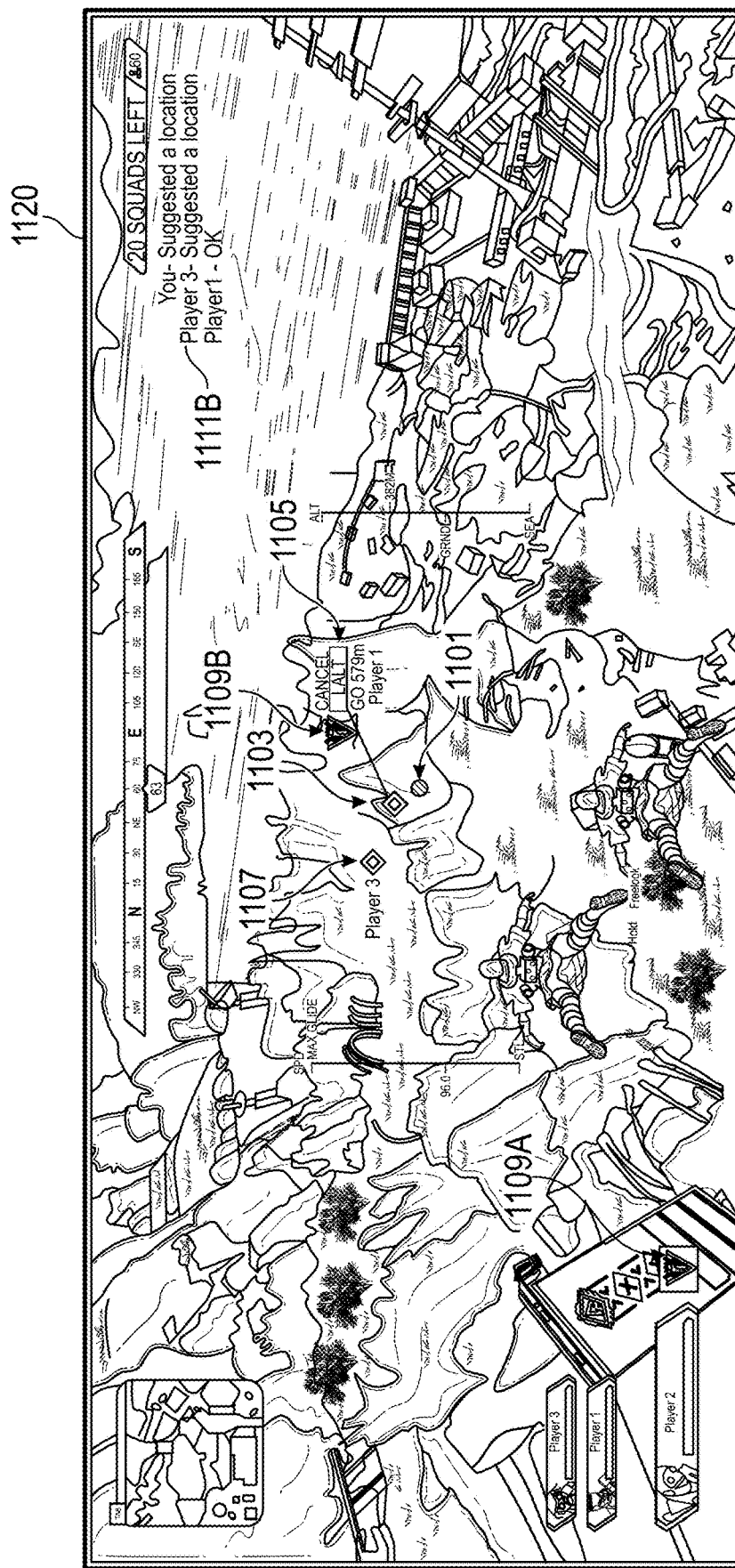
FIG. 11B shows an example illustrated screenshot of player 2's field of view in a video game after player 1 sends an acknowledgment ping.
Figure 12A:
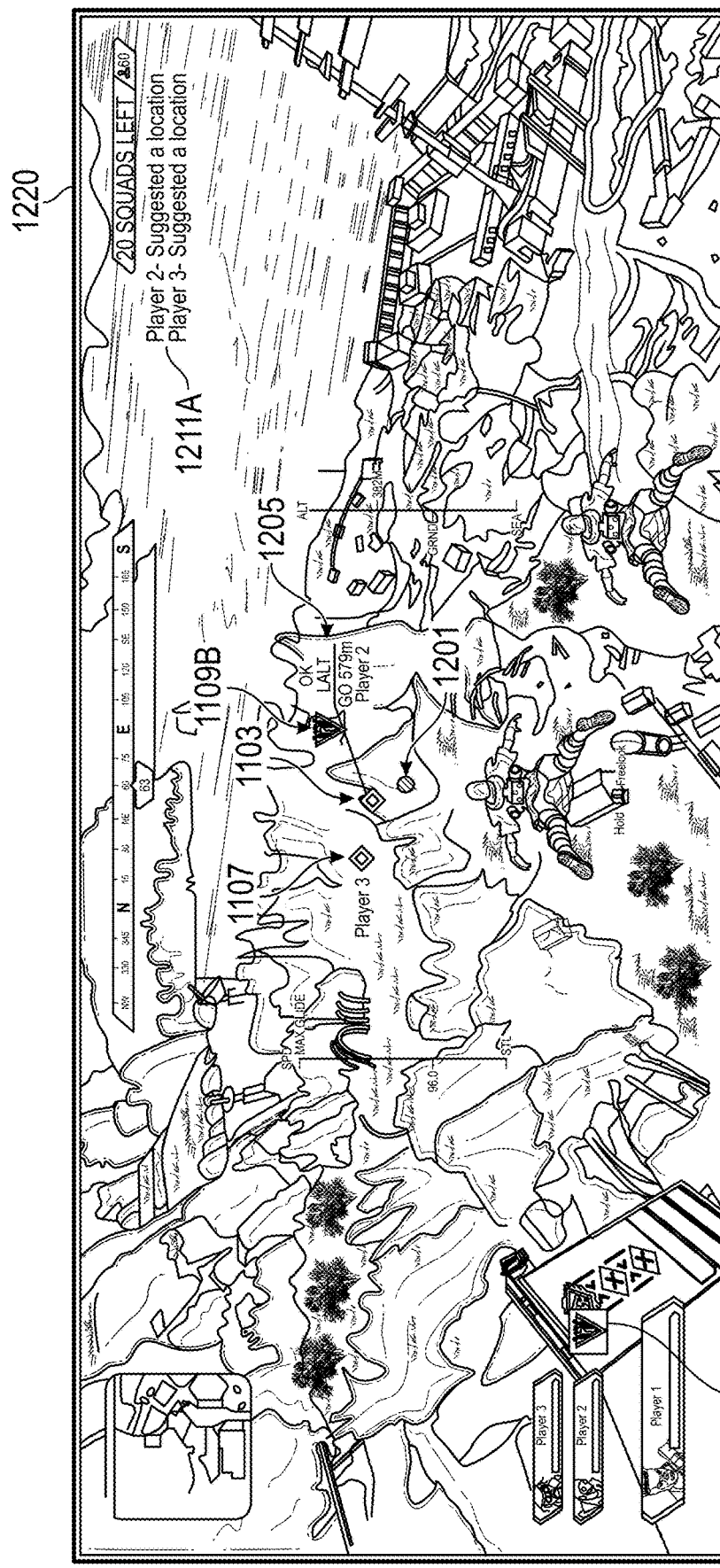
FIG. 12A shows an example illustrated screenshot of player 1's field of view in a video game before player 1 sends an acknowledgement ping.
Figure 12B:
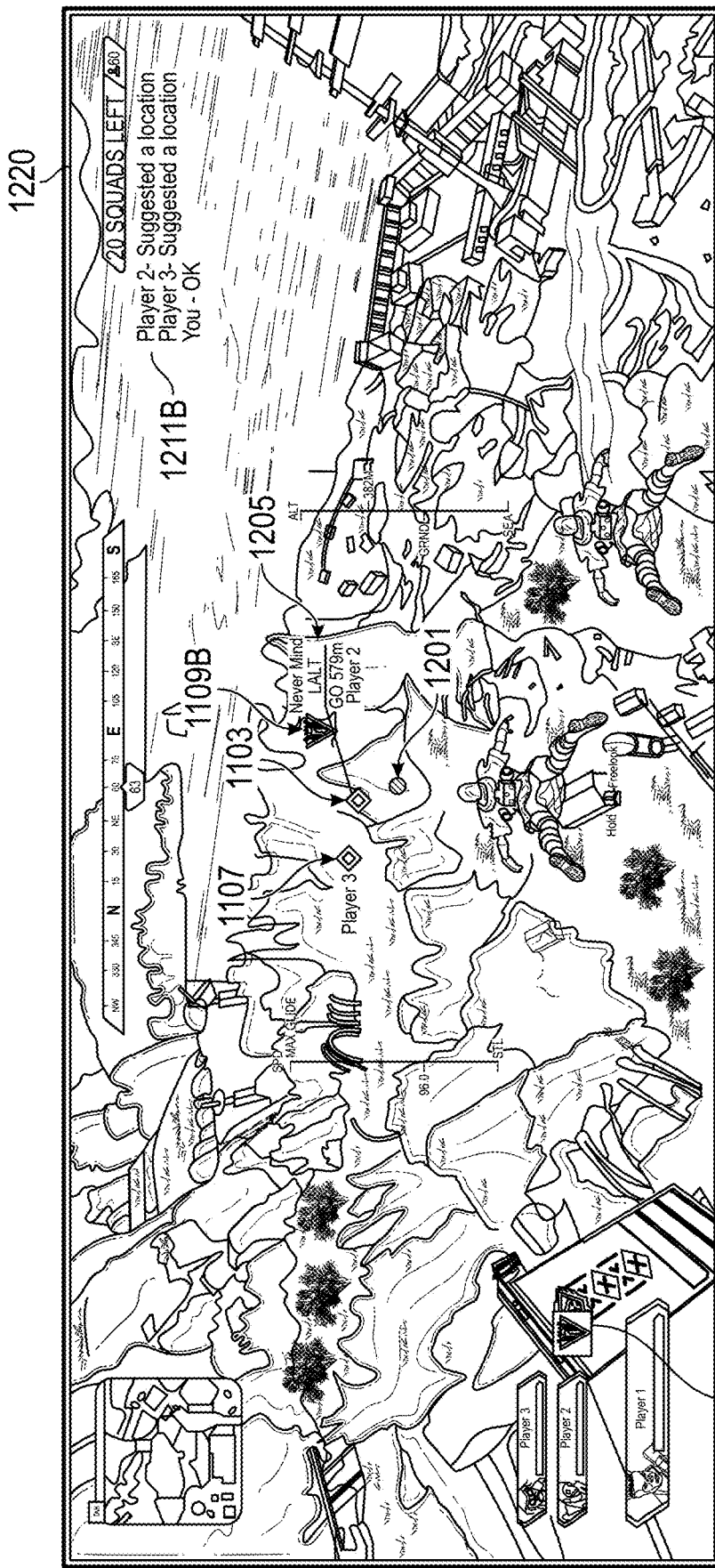
FIG. 12B shows an example illustrated screenshot of player 1's field of view in a video game after player 1 sends an acknowledgment ping.

FIG. 11A and FIG. 11B show example illustrated screenshots 1100, 1120 of gameplay from the perspective of player 2 in a video game. FIGS. 12A and 12B show example illustrated screenshots 1200, 1220 of the same gameplay from the perspective of player 1 in the video game. In the illustrated screenshots 1100 of FIG. 11A and 1200 of FIG. 12A, the players' characters are gliding through the air, and markers at target locations 1103, 1107 have been suggested by player 2 and player 3 (whose character is off-screen), respectively, for the team to approach. Player 1 sends a contextually aware response communication to acknowledge the target location 1103 suggested by Player 2. FIGS. 11B and 12B show the resulting screenshots 1120, 1220 after player 1 has sent the contextually aware response communication.

In FIG. 11A and FIG. 11B, player 2's screen is centered on position 1101. A first visual icon 1103 marks a target location previously communicated by player 2. A second visual icon 1107 marks a target location previously communicated by player 3 and includes the label "Player 3" to identify the player who suggested the location 1107. Icons 1109A and 1109B identify the team leader.

In FIG. 12A and FIG. 12B, player 1's screen is centered on position 1201. A first visual icon 1103 marks the target location previously communicated by player 2. A second visual icon 1107 marks the target location previously communicated by player 3 and includes the label "Player 3" to identify the player who suggested the location 1107. Icons 1109A and 1109B identify the team leader.

Before Acknowledgement Communication

FIG. 11A shows an example of how the process 200 described with respect to FIG. 2 and the process 400 described with respect to FIG. 4 can be used to determine a contextually aware communication action for player 2 based on previous communication actions 219 discussed with respect to FIG. 2. In FIG. 11A, the distance between the target location 1101 and the visual marker at target location 1103 that player 2 previously communicated to the rest of the team are used in a determination to present player 2 with a contextually aware communication action to send a cancellation communication action to player 2's teammates by pressing the left alt button. The determination to present a cancelation option for target location 1103 is made partially in response to the same player previously communicating to go to target location 1103.

The cancellation communication action can include one or more of: making corresponding communication markers (such as communication marker 1103 shown in FIG. 12A and FIG. 12B) disappear from the views of other players, sending text to other players indicating that the suggested target location 1103 is canceled, or audibly announcing to other players that the suggested target location 1103 is canceled.

If player 2 were to suggest a second location (not shown), then a new marker can be created at the second location and the original location 1103 communicated by the second player can disappear and player 2's character can say, "Let's go here instead," or words of similar effect. Accordingly, the communication action for player 2 would be based partially on the previous communication action of player 2.

As shown in FIG. 11A and further described with respect to FIG. 14A and FIG. 14B, the contextually aware communication system can be configured to change and display different visual markers to a player based at least in part on the proximity of the visual marker to what the player is focusing on. For example, FIG. 11A shows that in comparison to target location 1107, additional detail 1105 is displayed to the second player regarding the target location 1103 based at least in part on player 2 focusing on location 1103 by positioning the center of the screen 1101 closer to target location 1103. The additional detail 1105 includes an extension line and text. The text is positioned away from the center of the screen 1101 to avoid obscuring other visual information around that area. The extension line visually indicates that the text is related to the target location 1103.

FIG. 11A shows an example of how the process 200 described with respect to FIG. 2 and the process 400 described with respect to FIG. 4 can be used to determine a contextually aware communication action based on recent events in the game 215 and/or other game state data 221 discussed with respect to FIG. 2. In the part of the game illustrated in FIG. 11A, the players' characters are gliding through the air as a group and led by the team leader player 2 as indicated by the icon 1107. The visual communication action of player 2 to display a marker 1103 to player 1 as shown in FIG. 12A is customized to additionally include the icon 1109B. When game state data indicates other stages of the game where the players are not moving as a group led by a group leader, visual communication actions of player 2 will not cause the marker 1109B to be displayed to other players. In other examples, any type of customization can be made to communication actions based on any other game state.

FIG. 12A shows an example of how the process 200 described with respect to FIG. 2 and the process 400 described with respect to FIG. 4 can be used to determine a contextually aware communication action for player 1 based on previous communication actions 219 discussed with respect to FIG. 2. In FIG. 12A, the distance between the target location 1201 and the visual marker at target location 1103 that player 2 previously communicated to the rest of the team are used in a determination to present player 1 with a contextually aware communication action to send an "OK" type acknowledgment to the player 1's teammates by pressing the left alt button. The determination to present an acknowledgement option for target location 1103 is made in partially response to the different teammate previously communicating to go to target location 1103.

The acknowledgement communication action can include animating or changing the corresponding communication markers (such as communication marker 1103 shown in FIG. 11A and FIG. 11B) by changing color or adding text to indicate the acknowledgment as seen by other players, sending text to other players indicating that player 1 acknowledges player 2's suggested target location 1103, or audibly announcing to other players that the suggested target location 1103 is canceled.

After Acknowledgement Communication

FIG. 11B shows the effects, as perceived by player 2, of player 1's acknowledgment of player 2's suggested target location 1103. In response to player 1 sending an acknowledgment, the additional details 1105 associated with the target location 1103 can be updated to list "Player 1" as a teammate who acknowledged player 1's suggestion to travel to target location 1103. The diamond icon at target location 1103 can additionally or alternatively animate, change in size, change in color, change in shape, or have other visual effects. The text 1111B can additionally or alternatively indicate that Player 1 agreed to go to the suggested target location 1103. Sound can additionally or alternatively be played by player 2's computing system with the audio line, "Roger that," or other words of similar effect spoken in the voice of player 1's character. Other sounds, such as a ring, chime, or other effect, can additionally or alternatively be played by player 2's computing system.

FIG. 12B shows the effects, as perceived by player 1, of player 1's acknowledgment of player 2's suggested target location 1103. In response to player 1 sending an acknowledgment, the diamond icon at target location 1103 can additionally or alternatively animate, change in size, change in color, change in shape, or have other visual effects. The text 1211B can additionally or alternatively indicate that Player 1 agreed to go to the suggested target location 1103. Sound can additionally or alternatively be played by player 1's computing system with the audio line, "Roger that," or other words of similar effect spoken in the voice of player 1's character. Other sounds, such as a ring, chime, or other effect, can additionally or alternatively be played by player 1's computing system. The option to make an "OK" type acknowledgment can be removed and be replaced with a "never mind" type response option or be replaced with an option to send some other type of communication.

The effects of player 1's acknowledgment shown to player 1 can optionally be different from the effects shown to player 2. For example, the text 1211B can indicate to player 1, "You—OK," whereas the text 1111B can indicate to player 2, "Player 1—OK." The additional details 1205 can optionally be different from the additional details 1105, for example, by identifying player 1 in the additional details 1105 for player 2 to recognize. However, player 1, aware of his or her own acknowledgment actions, may not need such an explicit listing in the details 1205.

In some alternative implementations, when player 1 acknowledges player 2's suggested location, the visual marker 1103 can disappear from the player 1's field of view such that the visual marker 1103 does not obscure player 1's vision.

Other Example Communication Sequences

As described with respect to block 219 of FIG. 2 and with respect to FIG. 11A, FIG. 11B, FIG. 12A, and FIG. 12B, a contextually aware communication can be determined based at least in part on previous communication actions.

Some sequences of contextually aware communications can be performed by one player. For example, a first player can send an audio communication, "Let's go here," followed by a second audio communication, "Cancel that." As another example, a first player can send an audio communication, "Let's go here," followed by a second audio communication, "Let's go here instead." As another example, a first player can send an audio communication, "Enemy spotted," followed by "Enemy spotted" at increasing louder volumes for each successive communication.

A first player can perform a first contextually aware communication action regarding a target location to teammates. The first player, by subsequently focusing near the target location within a threshold period of time, can be presented with the contextually aware option to send a second contextually aware communication canceling the first contextually aware communication action. As another example, a first player may send a first contextually aware communication action about a first target location to inform the player's teammates, "Let's go here," and create a first visual marker at the first target location. The first player can subsequently send a second contextual action within a threshold period of time about a second target location to inform the player's teammates, "Let's go here instead," create a second visual marker at the second location, and cause a visual marker at the first target location to disappear.

Some sequences of contextually aware communications can be performed by two or more players. For example, a first player may perform a first contextually aware communication action regarding a target location to teammates and cause a visual marker to be displayed at the target location. A second player, by subsequently focusing near the target location within a threshold period of time, can be presented with a contextually aware response option, such as agreeing to the communicated action, acknowledging the communicated action, calling "dibs" on items at the location, and the like. An acknowledgment or response by the second player can cause a timeout period of the visual marker to extend and cause the visual marker to change by indicating the second player's response or acknowledgement.

Character Distance Invariance

Figure 13A:
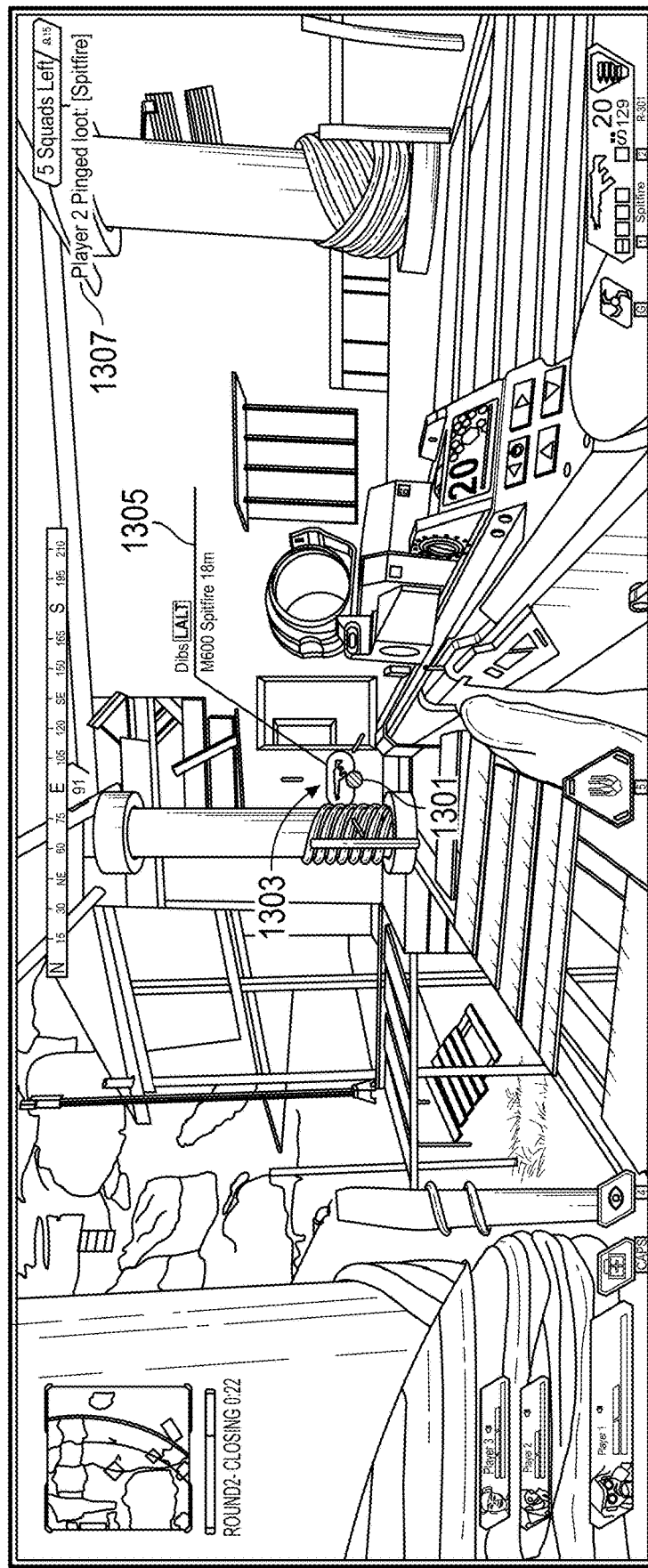
FIGS. 13A and 13B show example illustrated screenshots of gameplay as seen by a first player approaching a marked item.
Figure 13B:
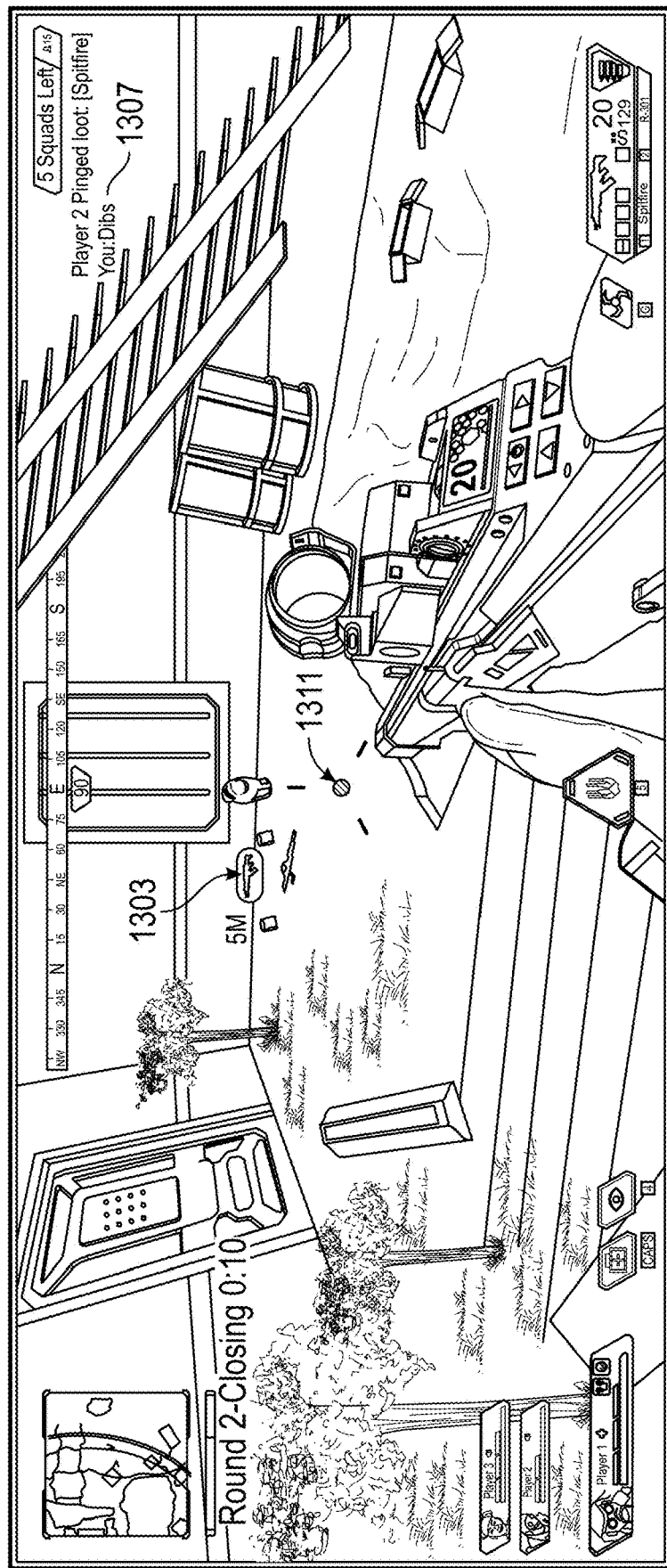

FIGS. 13A and 13B show example illustrated screenshots 1300, 1320 of a first player's field of view. A second player has sent a contextually aware communication about the position of a spitfire weapon item to the first player. As part of the contextually aware communication, an icon 1303 is displayed to the first player, and a text message 1307 notifies the first player that the second player has pinged the particular type of weapon. In FIG. 13A, the first player's screen is centered at spot 1301. In FIG. 13B, the first player's character has moved closer to the spitfire weapon item and the first player's screen is centered on spot 1311.

In the illustrated example, the size of the icon 1303 displayed to the first player as part of the second player's contextually aware communication action is invariant with respect to the distance between the pinged item (the spitfire weapon) and the first player's character. Even though the first player's character is closer to the item in FIG. 13B, the size of the icon 1303 remains constant. In other examples, the icon size can vary with the distance of the player's character to a pinged location.

In the illustrated example, FIG. 13A shows that the icon 1303 is visible to the first player even though the weapon item is behind a wall and inside of a room. The visual icons displayed as part of contextually aware communications can be visible over walls and other opaque objects that would otherwise block the player's line of sight. In some implementations, the item that is communicated about can additionally or alternatively be seen through walls. In some implementations, the icons can be obscured by objects blocking line of sight.

In FIG. 13A, in response to the player focusing the center of the screen 1301 on the icon, additional details 1305 can be displayed. The additional details can include a lead line extending away from the center of the screen 1301 to avoid obscuring other visuals that the player is focusing on. At a distance away from the lead line, the details 1305 include text stating the type of weapon item, the distance between the player's character and the item's in-game location, and the type of contextually aware communication that the player can make by providing the user input for making a contextually aware communication action, which is pressing the left alt button in the illustrated example. The illustrated example contextually aware communication action is to call "dibs" on the item to let other teammates know that the player wants to lay claim to and pick up the marked item.

The contextually aware communication action of calling "dibs" on the spitfire weapon item can be determined, for example, using the process 200 described with respect to FIG. 2 and the process 400 described with respect to FIG. 4 in view of the player focusing on a visual marker previously placed by a teammate regarding an item.

In response to pressing the button to make a contextually aware communication, the player's character can audibly call, "Dibs," to other teammates playing the game. The icon 1303 can additionally or alternatively be animated, change in size or color, list the first player as calling dibs, and the like. The text 1307 can additionally or alternatively indicate that the first player has called dibs in response to the second player's ping. In FIG. 13B, the text 1307 is updated to additionally display, "You: Dibs," to the first player, and can be updated to display, "Player 1 called dibs," or a similar message to other players on the team.

Example Marker Variance

FIG. 14A shows three illustrated screenshots 1400A, 1400B, and 1400C showing various ways that a marker can change based on where a player is focusing and a character's position relative to the marker. In the illustrations 1400A, 1400B, and 1400C, a player's character is approaching and looking near a weapon attachment. The marker 1403 can optionally be displayed with visuals 1405 or 1409 based at least in part on a target location (e.g., as determined with reference to the center of the screens) and additionally or alternatively on a distance between the marked item and the player's character.

In the illustration 1400A, the player's screen is centered at 1401A, which is offset from the item by at least a first threshold distance. The marker icon 1403 is displayed to the player in response to previous contextually aware communication by a teammate. The player's character is at least a second threshold distance away from the upgrade item.

In the illustration 1400B, the player's screen is centered at 1401B, which is over the item and within the minimum threshold distance. The marker icon 1405 is displayed to the player and now includes additional details 1407 at the end of a lead line. The player's character remains at least the second threshold distance away from the upgrade item.

Based at least in part on the position of the player's screen and the character's distance from the item, additional details about the upgrade item can be displayed away from the center of the screen to avoid obscuring other visuals where the player is looking. The additional details 1407 include a contextually aware communication action that the player can perform (e.g., calling "dibs"), identify the name and quantity of the upgrade item (e.g., 1× digital threat scope), and indicates the distance between the upgrade item and the player's character (e.g., 3 meters).

In the illustration 1400C, the player's screen is centered at 1401C, which is still over the item and within the minimum threshold distance. The player's character has also approached the upgrade item and is now within the second threshold distance of the marker item. Based at least in part on the distance, the marker icon 1409 is displayed to the player and now includes a larger detail box 1409. The larger details box 1409 provides even more details about the upgrade item, such as what base items can be upgraded or used with the upgrade item, what the upgrade item does, which keys to press to use the upgrade item, and the like. The additional details 1407 include a contextually aware communication action that the player can perform (e.g., calling "dibs"), identify the name and quantity of the upgrade item (e.g., 1× digital threat scope), and indicates the distance between the upgrade item and the player's character (e.g., 3 meters).

FIG. 14B shows example illustrated screenshots 1420A and 1420B where a marker icon changes based on its distance from where a player is focusing. In screenshot 1420A, a player's screen is centered on spot 1421A, which is a distance R1 away from marker icons 1423A displayed as part of a contextually aware communication from a second player. In screenshot 1420B, the player's field of view has rotated left such that the center of the screen 1421B is distance R2 away from the marker icons 1423B.

Based at least in part on a distance between marker icons and an area being focused on by a player (such as described with respect to process 400 of FIG. 4, markers displayed to players can change. In FIG. 1420A, based at least in part on the distance R1 being greater than a threshold distance, the icons 1423A can be made larger and include more details such that the markers are more visible to the player when in the player's periphery. In FIG. 1420B, based at least in part on the distance R2 being within the threshold distance, the icons 1423B can be made smaller and include fewer details to avoid obscuring other visuals near the center of the player's focus.

The marker 1423A can be configured to decrease in size as the center 1421A of a player's field of view moves toward the marker 1423A. The marker 1423B can be configured to increase in size as the center 1421B of the player's field of view moves away from the marker 1423B.

Example Outline Visibility

FIG. 15 shows an example illustrated screenshot 1500 with a marked 1503 door 1505 displayed over an opaque intervening object. The player's screen is centered at location 1501, and the player has previously made a contextually aware communication to other players about the location of the door. As part of making the contextually aware communication, the marker 1503 can be displayed to both the player and the player's teammates. Additionally or alternatively, the door 1505 can be outlined as part of making the contextually aware communication. Additionally or alternatively, the door 1505 and/or the marker 1503 can be exposed to the player and the players' teammates over an intervening opaque wall that would otherwise obscure the door from the line of sight.

Contextually Aware Communication Menus

Figure 16:
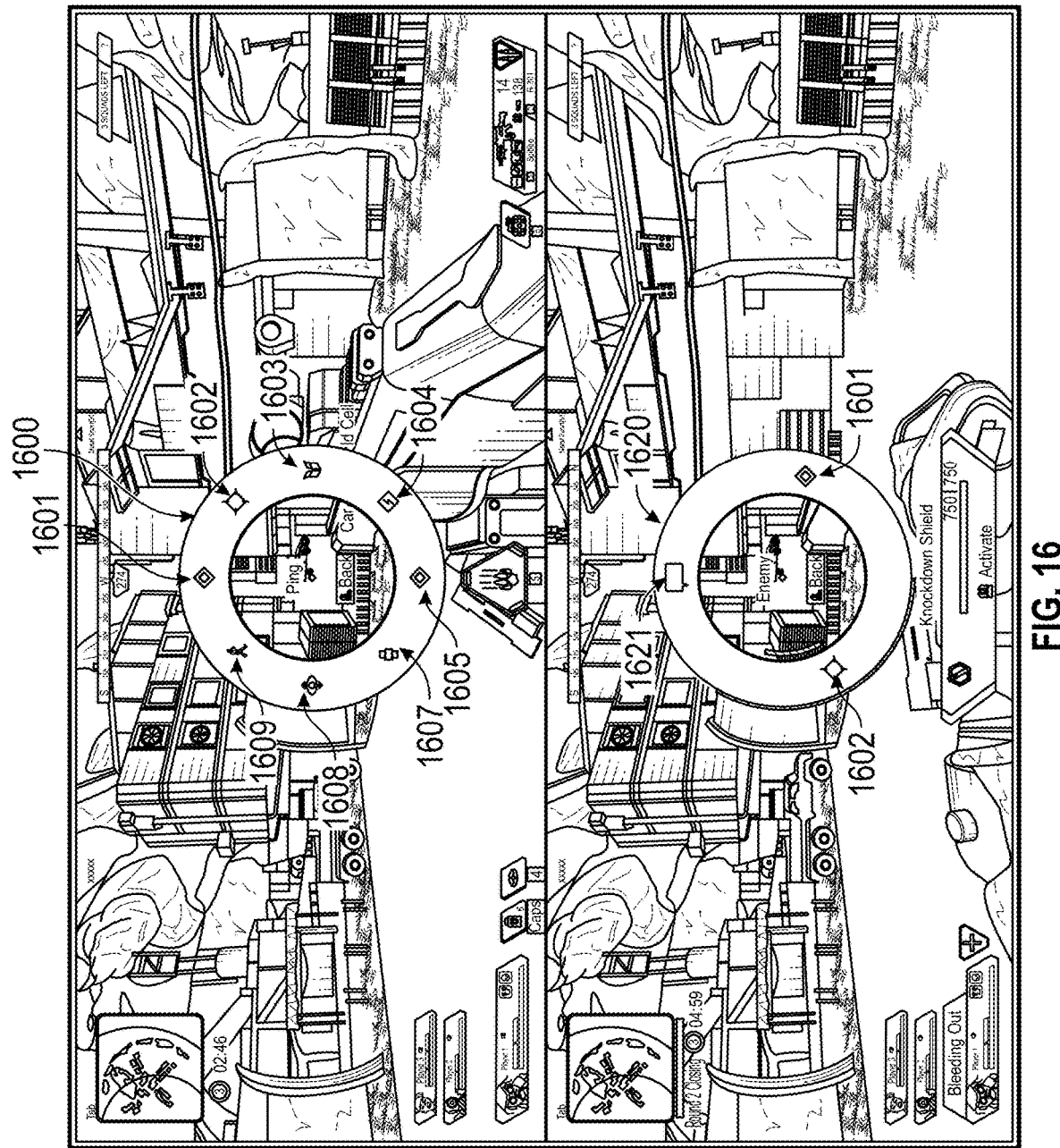
FIG. 16 shows an example of contextually aware communication menus.

FIG. 16 shows an example of contextually aware communication menus 1600 and 1620. Different contextually aware communication menus can be displayed based on different game states and/or based on a player focusing on different items.

In the illustrated example, a first contextually aware menu 1600 can be displayed in response to user input that is different from sending a contextually aware communication. For example, the contextually aware menu 1600 can be displayed by pressing and holding a button for making a contextually aware communication instead of pressing and releasing the button. In other examples, a separate key can be used to distinguish sending contextually aware communications and opening a contextually aware communication menu.

In the illustrated examples, the first contextually aware menu 1600 is displayed in response to the player pressing and holding a button for making a contextually aware communication during a game state in which the player's character is capable of performing a variety of actions. The second contextually aware menu 1620 is displayed in response to the player pressing and holding the button for making a contextually aware communication during a second game state in which the player's character is incapable of performing the original variety of actions, such as if the player's character has been injured or knocked down during a fight.

The first menu 1600 can be opened to display a plurality of options that can be selected through a second user input, such as moving a direction of a mouse in the direction of an icon representing a desired communication action and/or releasing the button for making a contextually aware communication. The first menu 1600 includes a first icon 1601 for sending a contextually aware communication action such as described with respect to FIG. 2, a second icon 1602 for sending an "Enemy spotted" type communication action, a third icon 1603 for sending a "Looting here" type of communication action, a fourth icon 1604 for sending an "Attacking here" type of communication action, a fifth icon 1605 for sending a "Going here" type of communication action, a sixth icon 1607 for sending a "Defending here" type of communication action, a seventh icon 1608 for sending a "Watching here" type of communication action, and an eighth icon 1609 for sending a "Someone's been here" type of communication action. Other examples can include more, fewer, and/or other types of communication actions in the first menu 1600. The communication actions can be executed by creating a visual indicator at a target location being focused on by the player for other teammates to see and/or causing a corresponding sound to be played for other players.

The second menu 1620 can be opened to display a second plurality of options that can be selected through a second user input, such as moving a direction of a mouse in the direction of an icon representing a desired communication action and/or releasing the button for making a contextually aware communication. The second menu 1620 includes a first icon 1621 for sending a "Help me" type communication action, a second icon 1601 for sending a contextually aware communication action such as described with respect to FIG. 2, and a third icon 1602 for sending an "Enemy spotted" type communication action. Other examples can include more, fewer, and/or other types of communication actions in the second menu 1620. The communication actions can be executed by creating a visual indicator at a target location being focused on by the player for other teammates to see and/or causing a corresponding sound to be played for other players. For example, the "Help me" communication action can cause the player's character to call out, "I need help" for the player's teammates to hear and to display the location of the player's character for the player's teammates to see.

Key Bindings

Players can customize their user input bindings for sending contextually aware communications. For example, on a console controller, a player can bind pressing and quickly releasing a first button, such as "A," or "X" or a right bumper to be the user input command for sending a contextually aware communication. A player on a personal computer can bind any a press and quick release of any keyboard button, mouse button, or other input from other input devices.

A different user input can be used for bringing up the contextually aware communication menu, such as the menus 1600, 1620 shown in FIG. 16. For example, on a console controller, a player can bind pressing holding the first button to be the user input command for displaying the contextually aware communication menu, or the player can bind a press and quick release of a separate button, such as "B" or "Y" or a left bumper button for displaying the contextually aware communication menu. A player can bind pressing holding the first button to be the user input command for displaying the contextually aware communication menu, or the player can bind a press and quick release of a separate button such as a mouse wheel for displaying the contextually aware communication menu.

Other user inputs can be bound to particular communication actions. For example, quickly double tapping the user input for sending a contextually aware communication can cause the "Enemy spotted" marker and audio communication to be performed. Unique user inputs can be assigned to any of the other types of communication actions disclosed herein.

Example Pinging in a Menu

Figure 17:
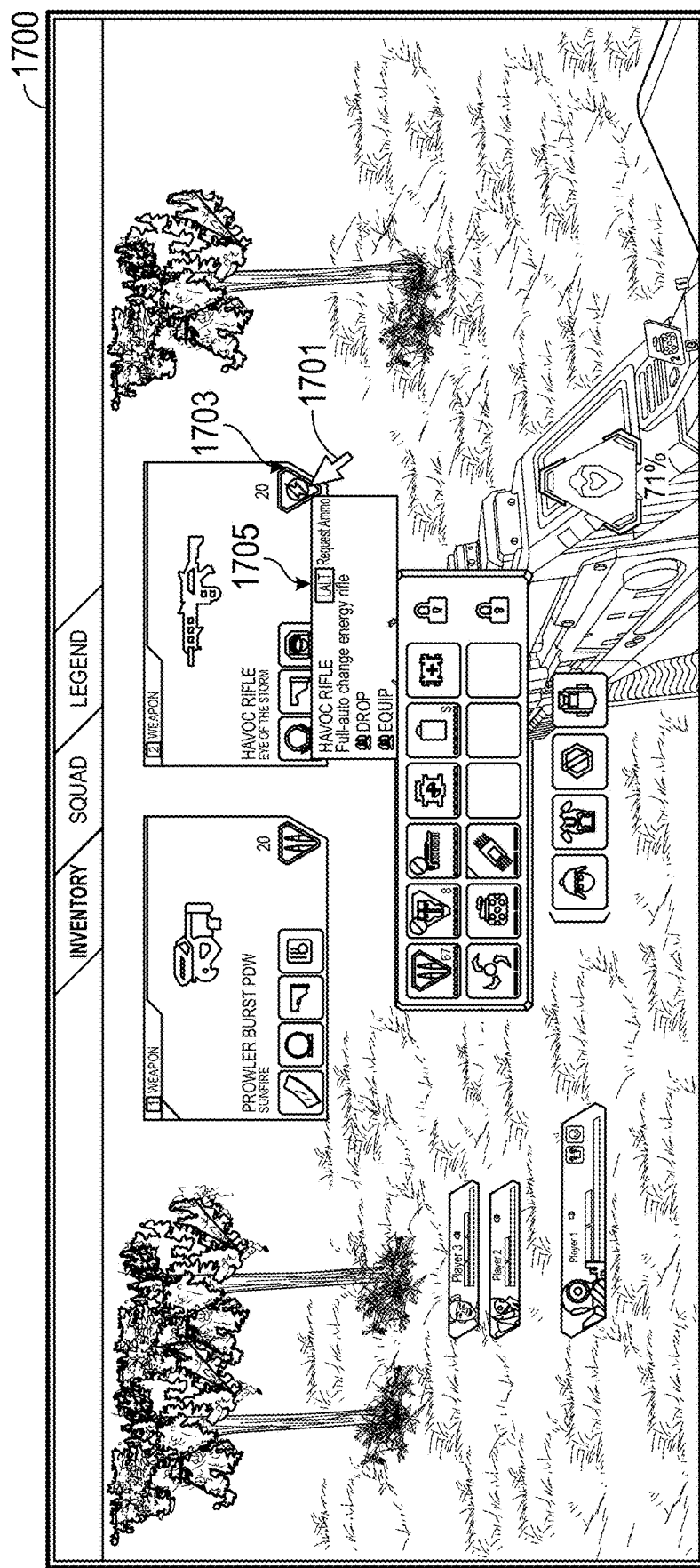
FIG. 17 shows an example inventory menu in a video game.

FIG. 17 shows an example inventory menu 1700 in a video game. The inventory menu 1700 shows a plurality of inventory icons. A cursor 1701 is positioned over the inventory icon 1703 representing energy ammo, causing an information box 1705 to be displayed. In accordance with the process 200 described with respect to FIG. 2, a contextually aware communication action can be made available to the player to ask teammates for more energy ammo. The cursor 1701 can be used as a reference point to identify the unit that the player is focusing on instead of using the center of the screen. The informational box 1705 can indicate that the user input for contextually aware communications (e.g., the left alt button) can be activated to "Request Ammo." In response, the player's character can say, "I need energy ammo," to player's teammates.

If the player's cursor were moved over a different icon such as the icon for a grenade, then in response to the player providing the user input for contextually aware communications (e.g., the left alt button), the character can say, "I need more grenades." If the player's cursor were positioned over the icon for a body shield, then in response to the player providing the user input for contextually aware communications (e.g., the left alt button), the character can say, "I need better body armor." Various contextual voice lines can be spoken by character according to which icon a player is focusing on when the player provides the user input for contextually aware communications. Additionally or alternatively to the voice lines, a marker can be visually shown at the location of the player's character making the request.

Other Aspects

In some video games, a player's ability to perform and/or receive certain communication actions, visuals, and/or sounds can be restricted to a subset of communication actions, visuals, and/or sounds based at least in part on a character that the player selects to play in the video game. For example, certain characters may be able to make certain communication actions that are not available when playing as other characters.

In some video games, a contextually aware communication action can be automatically be performed by one or more characters on a team in response to certain characters performing certain actions in a game, such as using a skill. For example, a character with an ability to create portals between locations can announce to the team, "Creating a portal," and cause a marker to be displayed at the location of the portal whenever that character creates a portal.

In some video games, a contextually aware communication action can be automatically be performed by one or more characters on a team in response to certain events occurring in the game. For example, in response to new supply items dropping into a virtual environment, at least one player can announce, "New items dropping over there" and cause a marker to be displayed at the location of the drop.

Overview of Computing Device

Figure 18:
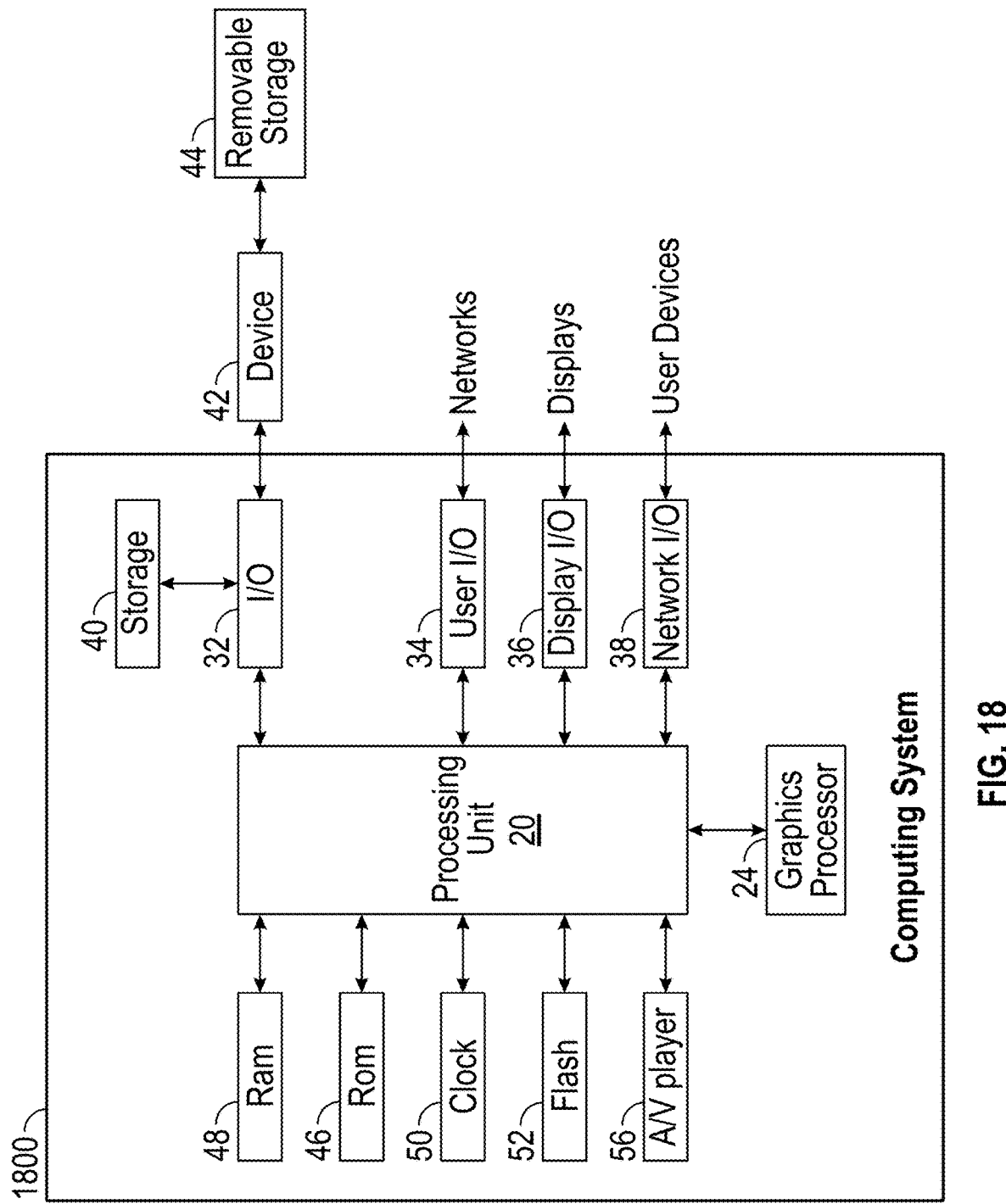
FIG. 18 illustrates an example of a computing system according to the present disclosure.

FIG. 18 illustrates an example of a computing system 1800 according to the present disclosure. Other variations of the computing system 1800 may be substituted for the examples explicitly presented herein, such as removing or adding components to the computing device 100. The computing system 1800 may include a game device, a smart phone, a tablet, a personal computer, a laptop, a smart television, a car console display, a server, and the like. As shown, the computing system 1800 includes a processing unit 20 that interacts with other components of the computing system 1800 and also external components to computing system 1800. A media reader 22 is included that communicates with media 12. The media reader 22 may be an optical disc reader capable of reading optical discs, such as CD-ROM or DVDs, or any other type of reader that can receive and read data from game media 12. One or more of the computing devices may be used to implement one or more of the systems disclosed herein.

Computing system 1800 may include a separate graphics processor 24. In some cases, the graphics processor 24 may be built into the processing unit 20. In some such cases, the graphics processor 24 may share Random Access Memory (RAM) with the processing unit 20. Alternatively, or in addition, the computing system 1800 may include a discrete graphics processor 24 that is separate from the processing unit 20. In some such cases, the graphics processor 24 may have separate RAM from the processing unit 20. Computing system 1800 might be a handheld video game device, a dedicated game console computing system, a general-purpose laptop or desktop computer, a smart phone, a tablet, a car console, or other suitable system.

Computing system 1800 also includes various components for enabling input/output, such as an I/O 32, a user I/O 34, a display I/O 36, and a network I/O 38. I/O 32 interacts with storage element 40 and, through a device 42, removable storage media 44 in order to provide storage for computing system 1800. Processing unit 20 can communicate through I/O 32 to store data, such as game state data and any shared data files. In addition to storage 40 and removable storage media 44, computing system 1800 is also shown including ROM (Read-Only Memory) 46 and RAM 48. RAM 48 may be used for data that is accessed frequently, such as when a game is being played or the fraud detection is performed.

User I/O 34 is used to send and receive commands between processing unit 20 and user devices, such as game controllers. In some examples, the user I/O can include a touchscreen inputs. The touchscreen can be capacitive touchscreen, a resistive touchscreen, or other type of touchscreen technology that is configured to receive user input through tactile inputs from the user. Display I/O 36 provides input/output functions that are used to display images from the game being played. Network I/O 38 is used for input/output functions for a network. Network I/O 38 may be used during execution of a game, such as when a game is being played online or being accessed online and/or application of fraud detection, and/or generation of a fraud detection model.

Display output signals produced by display I/O 36 comprising signals for displaying visual content produced by computing system 1800 on a display device, such as graphics, user interfaces, video, and/or other visual content. Computing system 1800 may comprise one or more integrated displays configured to receive display output signals produced by display I/O 36. According to some examples, display output signals produced by display I/O 36 may also be output to one or more display devices external to computing system 1800, such a display 16.

The computing system 1800 can also include other features that may be used with a game, such as a clock 50, flash memory 52, and other components. An audio/video player 56 might also be used to play a video sequence, such as a movie. It should be understood that other components may be provided in computing system 1800 and that a person skilled in the art will appreciate other variations of computing system 1800.

Program code can be stored in ROM 46, RAM 48 or storage 40 (which might comprise hard disk, other magnetic storage, optical storage, other non-volatile storage or a combination or variation of these). Part of the program code can be stored in ROM that is programmable (ROM, PROM, EPROM, EEPROM, and so forth), part of the program code can be stored in storage 40, and/or on removable media such as game media 12 (which can be a CD-ROM, cartridge, memory chip or the like, or obtained over a network or other electronic channel as needed). In general, program code can be found embodied in a tangible non-transitory signal-bearing medium.

Random access memory (RAM) 48 (and possibly other storage) is usable to store variables and other game and processor data as needed. RAM is used and holds data that is generated during the execution of an application and portions thereof might also be reserved for frame buffers, application state information, and/or other data needed or usable for interpreting user input and generating display outputs. Generally, RAM 48 is volatile storage and data stored within RAM 48 may be lost when the computing system 1800 is turned off or loses power.

As computing system 1800 reads media 12 and provides an application, information may be read from game media 12 and stored in a memory device, such as RAM 48. Additionally, data from storage 40, ROM 46, servers accessed via a network (not shown), or removable storage media 46 may be read and loaded into RAM 48. Although data is described as being found in RAM 48, it will be understood that data does not have to be stored in RAM 48 and may be stored in other memory accessible to processing unit 20 or distributed among several media, such as media 12 and storage 40.

It is to be understood that not necessarily all objects or advantages may be achieved in accordance with any particular example described herein. Thus, for example, those skilled in the art will recognize that certain examples may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the example, certain acts, events, or functions of any of the algorithms described herein can be performed in a different sequence, can be added, merged, or left out altogether (for example, not all described acts or events are necessary for the practice of the algorithms). Moreover, in certain examples, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the examples disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another example, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain examples include, while other examples do not include, certain features, elements and/or steps. Thus, such conditional language is not generally intended to imply that features, elements and/or steps are in any way required for one or more examples or that one or more examples necessarily include logic for deciding, with or without user input or prompting, whether these features, elements and/or steps are included or are to be performed in any particular example.

Disjunctive language such as the phrase "at least one of X, Y, or Z," unless specifically stated otherwise, is otherwise understood with the context as used in general to present that an item, term, etc., may be either X, Y, or Z, or any combination thereof (for example, X, Y, and/or Z). Thus, such disjunctive language is not generally intended to, and should not, imply that certain examples require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the examples described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described examples, the elements of which are to be understood as being among other acceptable examples. All such modifications and variations are intended to be included herein within the scope of this disclosure.

Other Example Aspects

Other aspects include:

1. A computer system for sending smart communications by inferring intentions, the computer system comprising:
   one or more data stores storing:
      computer-readable instructions; and
      data indicating a first association between a first unit type in a virtual environment, a first communication action to be communicated to one or more other users, and a first threshold distance;
   one or more processors configured to execute the computer-readable instructions to cause the computer system to:
      obtain a first target location in the virtual environment indicated by the first user as a real-time response to the first user making the first interaction with the button;
      detect that a first unit of the first unit type is in the virtual environment within the first threshold distance from the first target location; and
      in response to the detection and in response to a first interaction by a first user with a button for sending communications, transmit data configured to cause communication of the first communication action to a second user.

2. The computer system of Aspect 1, wherein:
the data further indicates a second association between a second unit type, a second communication action, and a second threshold distance; and
the one or more processors are further configured to execute the computer-readable instructions to cause the computer system to:
  obtain a second first target location in the virtual environment indicated by the first user as a real-time response to the first user making the second interaction;
  determine that no units of the first unit type are in the virtual environment within the first threshold distance from the second target location;
  detect that a second unit of the second unit type is in the virtual environment within the first threshold distance from the second target location; and
  in response to the detection that the second unit of the second unit type is in the virtual environment within the first threshold distance from the second target location and in response to in response to a second interaction by the first user with the button, transmit instructions configured to cause the second communication action to the second user.

3. The computer system of Aspect 1, wherein the first unit type is one of: an item type or terrain.

4. The computer system of Aspect 1, wherein
the virtual environment is simulated in three directional dimensions;
the first target location is at a three dimensional position located at an end of a trace through the virtual environment, the trace starting from a reticle, target, cursor, marker, or direction positioned by the first user; and
detecting that the first unit of the first unit type is in the virtual environment within the first threshold distance from the first target location by includes calculating a three-dimensional distance from the three dimensional position to the first unit.

5. The computer system of Aspect 1, wherein:
the virtual environment is simulated in three directional dimensions;
the first target location is at a two dimensional position on a two dimensional projection of the virtual environment as seen by the first user; and
detecting that the first unit of the first unit type is in the virtual environment within the first threshold distance from the first target location by includes calculating a two-dimensional distance between the two dimensional position and the first unit.

6. The computer system of Aspect 1, wherein the communication action includes at least one of:
playing audio;
visually displaying text; or
generating a visual marker as a unit.

7. The computer system of Aspect 1, wherein:
the communication action includes at least generating a visual marker as an interface unit;
the data further indicates a second association between the visual marker, a second communication action including a reply to the first communication action, and a second threshold distance; and
the one or more processors are further configured to execute the computer-readable instructions to cause the computer system to:
  obtain a second first target location in the virtual environment indicated by the second user as a real-time response to the second user making the second interaction;
  detect that the visual marker is in the virtual environment within the second threshold distance from the second target location; and
  in response to the detection that the visual marker is in the virtual environment within the second threshold distance from the second target location and in response to in response to a second interaction by the second user with a second button, transmit instructions configured to cause the second reply communication action to the first user.

8. The computer system of Aspect 7, wherein:
the visual marker is configured to be displayed for an initial length of time; and
the length of time is configured to be changed in response to the detection that the visual marker is in the virtual environment within the second threshold distance from the second target location.

9. A computer-implemented method for sending contextually aware communications in a video game, the method comprising:
obtaining a first target location based at least in part on inputs provided by a first user;
detecting a first in-game unit of a first unit type within a first threshold distance from the first target location;
selecting a first communication action based at least in part on:
  detecting the first in-game unit of the first unit type within a first threshold distance from the first target location; and
  a first priority associated with the first unit type and associated with the first communication action; and
in response to the first user providing a first user input for sending a contextually aware communication first time, transmitting data to cause the first communication action to be communicated to a second user.

10. The computer-implemented method of Aspect 9, further comprising:
obtaining a second target location based at least in part on subsequent inputs provided by the first user;
detecting a second in-game unit of a second unit type within a second threshold distance from the second target location, the second type of in-game unit being different from the first type of in-game unit;
selecting a second communication action based on at least in part on:
  detecting the second in-game unit of the second unit type within the second threshold distance from the second target location; and
  a second priority associated with the second type of in-game unit and associated with the second communication action; and
in response to the first user providing the first user input a second time, transmitting data to cause the second communication action to a second user, wherein the second communication action is different from the first communication action.

11. The computer-implemented method of Aspect 11, wherein:
when the first user provides the first user input the second time, the first type of in-game unit is within the first threshold distance of the second target location; and
the second priority is prioritized over the first priority.

12. The computer-implemented method of Aspect 9, wherein the first target location is a location in a virtual environment determined based at least in part on one or more of:
   a cursor or pointer position controlled by the first user;
   a reticle, crosshair, aim, projectile path, or line of sight controlled by the first user;
   a screen position or field of view controlled by the first user; or
   a character position or orientation controlled by the first user.

13. The computer-implemented method of Aspect 9, wherein the first target location is determined based at least in part on one or more of:
   a trace or line of sight through a virtual environment originating from a starting point controlled by the first user; or
   a projectile path through the virtual environment originating from the starting point controlled by the first user.

14. The computer-implemented method of Aspect 9, wherein:
   a virtual environment in which the video game takes place has three spatial dimensions;
   the first target location is a three dimensional position; and
   the first threshold distance is measured through the three spatial dimensions.

15. The computer-implemented method of Aspect 9, wherein:
   a virtual environment in which the video game takes place has three spatial dimensions;
   the first target location is a two dimensional position seen through a two spatial dimensional field of view; and
   the first threshold distance is measured through two spatial dimensions.

16. The computer-implemented method of Aspect 9, wherein the first threshold distance is based at least in part on a second threshold distance used by an aim-assist or auto-aim module in the video game.

17. The computer-implemented method of Aspect 9, wherein selecting the first communication action is further based at least in part on:
   determining that a first distance between the first in-game unit and the target location is shorter than a second distance between a second in-game unit and the target location, wherein the second in-game unit is of the first unit type and is within the first threshold distance from the first target location; and
   wherein the first communication action includes visually marking a position of the first unit.

18. The computer-implemented method of Aspect 9, further comprising:
   dynamically customizing the first communication action based at least in part on a first position of the first unit.

19. The computer-implemented method of Aspect 9, wherein:
   the first communication action includes visually marking a position of the first unit with a first visual marker that is different from at least one other visual marker used for at least one other communication action.

20. The computer-implemented method of Aspect 19, further comprising:
   creating the first visual marker as a unit in a virtual environment in which the video game takes place.

21. The computer-implemented method of Aspect 19, further comprising:
   creating the first visual marker as a unit, interface unit, or overlay in a virtual environment in which the video game takes place, wherein a size of the first visual marker as displayed to the second user is independent of a distance between the first position of the first unit and a second position from which the second user sees the virtual environment.

22. The computer-implemented method of Aspect 19, further comprising:
   creating the first visual marker as a unit, interface unit, or overlay in a virtual environment in which the video game takes place; and
   while the first visual marker is within a field of view of the second user:
      reducing a size of the first visual marker as seen by the second user in response to the field of view of the second user centering on the first visual marker; and
      increasing the size of the first visual marker as seen by the second user in response to the first visual marker moving toward the periphery of the second user.

23. The computer-implemented method of Aspect 19, further comprising:
   transmitting data to cause the first communication action to teammates of the first user, wherein the teammates include the second user and a third user; and
   wherein the first visual marker is displayed to the second user as facing the second user; and
   wherein the first visual marker is displayed to the third user as facing the third user.

24. The computer-implemented method of Aspect 19, further comprising:
   creating the first visual marker as a collision-free unit in a virtual environment in which the video game takes place.

25. The computer-implemented method of Aspect 19, further comprising:
   in response to the second user pressing a second user input:
      obtaining a second target location based at least in part on inputs provided by the second user;
      detecting the visual marker within a second threshold distance from the second target location;
      selecting a second communication action based on at least in part on:
         detecting the visual marker within the second threshold distance from the second target location; and
         a priority of visual markers; and
      transmitting data to cause the second communication action to the first user, wherein the second communication action includes an reply to the first communication action.

26. The computer-implemented method of Aspect 25, wherein:
   the first visual marker is created to be shown to the second user with a timed lifespan; and
   the timed lifespan is extended based at least in part on:
      detecting the visual marker within the second threshold distance from the second target location; and
      the priority of visual markers.

27. The computer-implemented method of Aspect 19, wherein:
   the first visual marker is created to be shown to the second user with a timed lifespan; and
   the first visual marker is configured to disappear in response to the first unit being interacted with or disappearing.

28. The computer-implemented method of Aspect 19, wherein:
the first visual marker is created to be shown to the second user with a timed lifespan; and
the first visual marker is configured to disappear in response to the first unit being interacted with or disappearing.

29. The computer-implemented method of Aspect 19, further comprising:
creating the first visual marker as a unit, interface unit, or overlay in a virtual environment in which the video game takes place, wherein visual marker is displayed to the second user even if the first unit is outside of a field of view presented to the second user.

30. The computer-implemented method of Aspect 19, further comprising:
creating the first visual marker;
creating a plurality of subsequent visual markers in response to the first user pressing the user input a plurality of times;
removing the first visual marker based at least in part in response according to a first-in-first-out queue limit for visual markers of the first user.

31. The computer-implemented method of Aspect 19, further comprising:
creating the first visual marker;
creating a plurality of subsequent visual markers in response to the first user pressing the user input a plurality of times;
removing the first visual marker according to a first-in-first-out queue for visual markers of the first user.

32. The computer-implemented method of Aspect 19, further comprising:
creating the first visual marker;
based at least in part in response to the first user pressing the user input a second time, transmitting data to cause the first communication action to the second user, wherein the first communication action includes replacing the first visual marker with a second visual marker at a second position.

33. The computer-implemented method of Aspect 19, wherein:
the first visual marker indicates a distance between an in-game character of the second user and the first target location.

34. The computer-implemented method of Aspect 9, further comprising:
dynamically customizing the first communication action based at least in part on the first unit type or name of the first unit.

35. The computer-implemented method of Aspect 9, wherein:
the first communication action includes playing audio that is different from other sounds used for other communication actions.

36. The computer-implemented method of Aspect 35, wherein:
the audio is selected or modified to have a voice of an in-game character controlled by the first user.

37. The computer-implemented method of Aspect 35, wherein:
the audio is selected or modified based at least in part whether or not certain events have occurred in the video game within a threshold amount of recent time.

38. The computer-implemented method of Aspect 37, wherein:
the audio is selected or modified to be more urgent based at least in part combat events occurring in the video game within the threshold amount of recent time.

What is claimed is:

1. A computing system for managing communications within a virtual environment, the computing system comprising:
one or more data stores storing computer-executable instructions; and
one or more processors configured to execute the computer-executable instructions to cause the computing system to:
execute a virtual environment of a video game, wherein the virtual environment is a multiplayer game session comprising a plurality of virtual characters associated with respective users;
obtain a first target location in the virtual environment based at least in part on a first communication interaction, provided by a computing device corresponding to a first user, with the virtual environment;
determining priority tiers of unit types within the first target location;
determine a selection of a first unit of a first unit type based on a first priority of the first unit type within the virtual environment; and
in response to the determination and in response to the first communication interaction from the computing device corresponding to the first user, generate a first visual indicator associated with the first communication interaction;
transmit data configured to cause communication of a first communication action associated with the first unit type to a subset of the plurality of virtual characters.

2. The computing system of claim 1, wherein:
the one or more processors are further configured to execute the computer-executable instructions to cause the computing system to:
obtain a second target location in the virtual environment indicated by the first user as a real-time response to the first user making a second communication interaction;
determine that no units of the first unit type are in the virtual environment within a first threshold distance from the second target location;
detect that a second unit of a second unit type is in the virtual environment within the first threshold distance from the second target location; and
in response to the detection that the second unit of the second unit type is in the virtual environment within the first threshold distance from the second target location, transmit instructions configured to communicate a second communication action to a second user.

3. The computing system of claim 1, wherein the first unit type is one of: an item type, terrain, or another virtual character.

4. The computing system of claim 1, wherein
the virtual environment is simulated in three directional dimensions;
the first target location is at a three dimensional position located at an end of a trace through the virtual environment, the trace starting from a reticle, target, cursor, marker, or direction positioned by the first user; and
detecting that the first unit of the first unit type is in the virtual environment within a first threshold distance from the first target location includes calculating a three-dimensional distance from the three dimensional position to the first unit.

5. The computing system of claim 1, wherein:
the virtual environment is simulated in three directional dimensions;
the first target location is at a two dimensional position on a two dimensional projection of the virtual environment as seen by the first user; and
detecting that the first unit of the first unit type is in the virtual environment within a first threshold distance from the first target location by includes calculating a two-dimensional distance between the two dimensional position and the first unit.

6. The computing system of claim 1, wherein the first communication action includes at least one of:
playing audio content;
visually displaying text; or
generating a visual marker as a unit.

7. The computing system of claim 1, wherein the one or more processors are further configured to execute the computer-executable instructions to cause the computing system to:
obtain a second target location in the virtual environment indicated by a second user as a real-time response to the second user making a second communication interaction;
detect that a visual marker is in the virtual environment within a second threshold distance from the second target location; and
in response to the detection that the visual marker is in the virtual environment within the second threshold distance from the second target location and in response to in response to a second communication interaction by the second user, transmit instructions configured to communicate a second reply communication action to the first user.

8. The computing system of claim 7, wherein the visual marker is configured to be displayed for an initial length of time, and the length of time is configured to be changed in response to the detection that the visual marker is in the virtual environment within the second threshold distance from the second target location.

9. A computer-implemented method for managing communications in a video game, the method comprising:
executing a virtual environment of a video game, wherein the virtual environment is a multiplayer game session comprising a plurality of virtual characters associated with respective users;
obtaining a first target location in the virtual environment based at least in part on a first communication interaction, provided by a computing device corresponding to a first user, with the virtual environment;
determining priority tiers of unit types within the first target location;
determining a selection of a first unit of a first unit type based on a first priority of the first unit type within the virtual environment;
in response to the determination and in response to the first communication interaction from the computing device corresponding to the first user, generating a first visual indicator associated with the first communication interaction; and
transmitting data configured to cause communication of a first communication action associated with the first unit type to a subset of the plurality of virtual characters.

10. The computer-implemented method of claim 9, further comprising selecting a first communication action based at least in part on the first priority associated with the first unit type and associated with the first communication action.

11. The computer-implemented method of claim 9, further comprising:
obtaining a second target location based at least in part on subsequent inputs provided by the first user;
detecting a second in-game unit of a second unit type within a second threshold distance from the second target location, the second type of in-game unit being different from the first type of in-game unit;
selecting a second communication action based on at least in part on:
detecting the second in-game unit of the second unit type within the second threshold distance from the second target location; and
a second priority associated with the second type of in-game unit and associated with the second communication action; and
in response to the first user providing the first user input a second time, transmitting data to cause the second communication action to a second user, wherein the second communication action is different from the first communication action.

12. The computer-implemented method of claim 11, wherein:
when the first user provides the first user input the second time, the first type of in-game unit is within a first threshold distance of the second target location; and
the second priority is prioritized over the first priority.

13. The computer-implemented method of claim 9, wherein the first target location is a location in a virtual environment determined based at least in part on one or more of:
a cursor or pointer position controlled by the first user;
a reticle, crosshair, aim, projectile path, or line of sight controlled by the first user;
a screen position or field of view controlled by the first user; or
a character position or orientation controlled by the first user.

14. The computer-implemented method of claim 9, wherein the first target location is determined based at least in part on one or more of:
a trace or line of sight through a virtual environment originating from a starting point controlled by the first user; or
a projectile path through the virtual environment originating from the starting point controlled by the first user.

15. The computer-implemented method of claim 12, wherein:
a virtual environment in which the video game takes place has three spatial dimensions;
the first target location is a three dimensional position; and
the first threshold distance is measured through the three spatial dimensions.

16. The computer-implemented method of claim 12, wherein:
a virtual environment in which the video game takes place has three spatial dimensions;
the first target location is a two dimensional position seen through a two spatial dimensional field of view; and
the first threshold distance is measured through two spatial dimensions.

17. The computer-implemented method of claim 12, wherein the first threshold distance is based at least in part on a second threshold distance used by an aim-assist or auto-aim module in the video game.

18. The computer-implemented method of claim 12, wherein selecting the first communication action is further based at least in part on:
   determining that a first distance between the first in-game unit and the target location is shorter than a second distance between a second in-game unit and the target location, wherein the second in-game unit is of the first unit type and is within the first threshold distance from the first target location; and
   wherein the first communication action includes visually marking a position of the first unit.

19. The computer-implemented method of claim 9, further comprising dynamically customizing the first communication action based at least in part on a first position of the first unit.

20. The computer-implemented method of claim 9, wherein the first communication action includes visually marking a position of the first unit with a first visual marker that is different from at least one other visual marker used for at least one other communication action.

\* \* \* \* \*